(12) United States Patent
Min et al.

(10) Patent No.: US 12,418,834 B2
(45) Date of Patent: Sep. 16, 2025

(54) ELECTRONIC DEVICE AND METHOD FOR DETERMINING BANDWIDTH FOR PERFORMING WIRELESS COMMUNICATION CONNECTION WITH EXTERNAL DEVICE

(71) Applicant: SAMSUNG ELECTRONICS CO., LTD., Suwon-si (KR)

(72) Inventors: Hyunkee Min, Suwon-si (KR); Youngkow Lee, Suwon-si (KR); Junghun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 391 days.

(21) Appl. No.: 18/113,779

(22) Filed: Feb. 24, 2023

(65) Prior Publication Data

US 2023/0209407 A1   Jun. 29, 2023

Related U.S. Application Data

(63) Continuation of application No. PCT/KR2021/011973, filed on Sep. 3, 2021.

(30) Foreign Application Priority Data

Sep. 4, 2020  (KR) .......................... 10-2020-0113316
Dec. 3, 2020  (KR) .......................... 10-2020-0167785

(51) Int. Cl.
*H04W 28/08* (2023.01)
*H04W 28/02* (2009.01)

(52) U.S. Cl.
CPC .................. *H04W 28/0983* (2020.05); *H04W 28/0215* (2013.01); *H04W 28/0236* (2013.01)

(58) Field of Classification Search
CPC ......... H04W 28/0236; H04W 28/0215; H04W 28/0983
See application file for complete search history.

(56) References Cited

U.S. PATENT DOCUMENTS

| 8,068,455 B2 | 11/2011 | Utsunomiya et al. |
| 2008/0225717 A1 | 9/2008 | Chen et al. |

(Continued)

FOREIGN PATENT DOCUMENTS

| CN | 111149416 A | * | 5/2020 | ............ H04W 16/14 |
| JP | 2008-72563 |   | 3/2008 | |

(Continued)

OTHER PUBLICATIONS

International Search Report for PCT/KR2021/011973 mailed Dec. 3, 2021, 5 pages.

(Continued)

*Primary Examiner* — Kenny S Lin
(74) *Attorney, Agent, or Firm* — Nixon & Vanderhye, P.C.

(57) ABSTRACT

According to various embodiments of the present disclosure, an electronic device may include: a communication circuit and a processor operatively connected to the communication circuit, wherein the processor may be configured to: receive capability information including a maximum bandwidth of an external electronic device, determine a recommended bandwidth based on a comparison result of a first data rate according to interference in the maximum bandwidth of the external electronic device and a second data rate according to interference in at least one reference bandwidth, and perform a wireless communication connection with the external electronic device using the recommended bandwidth.

20 Claims, 17 Drawing Sheets

(56) References Cited

U.S. PATENT DOCUMENTS

| | | | |
|---|---|---|---|
| 2009/0086802 A1* | 4/2009 | Nabetani | H04W 28/20 |
| | | | 375/225 |
| 2009/0285116 A1 | 11/2009 | Nanda et al. | |
| 2009/0323600 A1 | 12/2009 | Chandra et al. | |
| 2010/0271965 A1* | 10/2010 | Siomina | H04L 5/0007 |
| | | | 370/252 |
| 2012/0094662 A1 | 4/2012 | Choi et al. | |
| 2013/0114473 A1 | 5/2013 | Awoniyi et al. | |
| 2013/0343341 A1 | 12/2013 | Kim et al. | |
| 2014/0242983 A1 | 8/2014 | Chang et al. | |
| 2014/0244805 A1 | 8/2014 | Lee et al. | |
| 2014/0301259 A1 | 10/2014 | Homchaudhuri et al. | |
| 2016/0192382 A1 | 6/2016 | Soldati et al. | |
| 2016/0309482 A1 | 10/2016 | Verma et al. | |
| 2017/0238316 A1* | 8/2017 | Li | H04W 72/0453 |
| | | | 370/329 |

FOREIGN PATENT DOCUMENTS

| | | | | |
|---|---|---|---|---|
| JP | 2008199102 A | * | 8/2008 | ........... H04B 7/2656 |
| JP | 2009-89052 | | 4/2009 | |
| KR | 20130101540 A | * | 9/2013 | ........... H04W 28/08 |
| KR | 10-1341192 | | 12/2013 | |
| KR | 10-2014-0090249 | | 7/2014 | |
| KR | 10-1522648 | | 5/2015 | |
| KR | 10-1727690 | | 4/2017 | |
| KR | 10-2034624 | | 10/2019 | |
| WO | 2015/184379 | | 12/2015 | |
| WO | WO-2019095938 A1 | * | 5/2019 | ........... H04L 5/0053 |

OTHER PUBLICATIONS

Written Opinion of the ISA for PCT/KR2021/011973 mailed Dec. 3, 2021, 4 pages.

* cited by examiner

ELECTRONIC DEVICE AND METHOD FOR DETERMINING BANDWIDTH FOR PERFORMING WIRELESS COMMUNICATION CONNECTION WITH EXTERNAL DEVICE

CROSS-REFERENCE TO RELATED APPLICATIONS

This application is a continuation of International Application No. PCT/KR2021/011973 designating the United States, filed on Sep. 3, 2021, in the Korean Intellectual Property Receiving Office and claiming priority to Korean Patent Application No. 10-2020-0113316, filed on Sep. 4, 2020, in the Korean Intellectual Property Office, and to Korean Patent Application No. 10-2020-0167785, filed on Dec. 3, 2020, in the Korean Intellectual Property Office, the disclosures of each of which are incorporated by reference herein in their entireties.

BACKGROUND

Field

The disclosure relates to an electronic device for determining a bandwidth for a wireless communication connection with an external device and an operating method thereof.

Description of Related Art

An electronic device scans for an external device in vicinity to exchange data and performs a wireless communication connection. Recently, standards for a bandwidth type, a channel, and a transmit power used for the wireless communication connection with external devices are diversifying.

An electronic device may perform communication by connecting wireless communication with an external device and selecting a frequency band and a bandwidth among a plurality of frequency bands and a plurality of bandwidths to exchange data. If the electronic device selects the frequency band and the bandwidth to perform the wireless communication with the external device and does not consider a surrounding environment (e.g., other external device or a locational restriction), channel interference may occur to thus deteriorate communication performance.

SUMMARY

Embodiments of the disclosure may provide an electronic device for determining a bandwidth for performing a wireless communication connection with an external device and an operating method thereof.

Technical problems addressed in this disclosure are not limited to the above-mentioned technical problems, and other technical problems which are not mentioned may be clearly understood by those skilled in the art of the present disclosure through the following descriptions.

According to various example embodiments of the present disclosure, an electronic device may include: a communication circuit and a processor operatively connected to the communication circuit, and the processor may be configured to: receive capability information including a maximum bandwidth of an external electronic device, determine a recommended bandwidth, based on a comparison result of a first data rate according to interference in the maximum bandwidth of the external electronic device and a second data rate according to interference in at least one reference bandwidth, and control the communication circuit to perform a wireless communication connection with the external electronic device using the recommended bandwidth.

A method according to an example embodiment, may include: receiving capability information including a maximum bandwidth of an external electronic device, determining a recommended bandwidth, based on a comparison result of a first data rate according to interference in the maximum bandwidth of the external electronic device and a second data rate according to interference in at least one reference bandwidth, and performing a wireless communication connection with the external electronic device using the recommended bandwidth.

An apparatus and a method according to various example embodiments of the present disclosure may improve user experience by mitigating interference between channels, and increasing a data rate over a channel, by allowing an electronic device to perform a wireless communication connection using a recommended bandwidth.

Effects obtainable from the present disclosure are not limited to the above-mentioned effects, and other effects which are not mentioned may be clearly understood by those skilled in the art of the present disclosure through the following descriptions.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

An electronic device may perform a wireless communication connection with an external electronic device using a recommended bandwidth.

Hereinafter, various example embodiments of the present disclosure are described with reference to the accompanying drawings. However, it is not intended to limit the present disclosure to specific embodiments, and it should be understood that various modifications, equivalents, and/or alternatives of the embodiments of the present disclosure are included.

Figure 1:
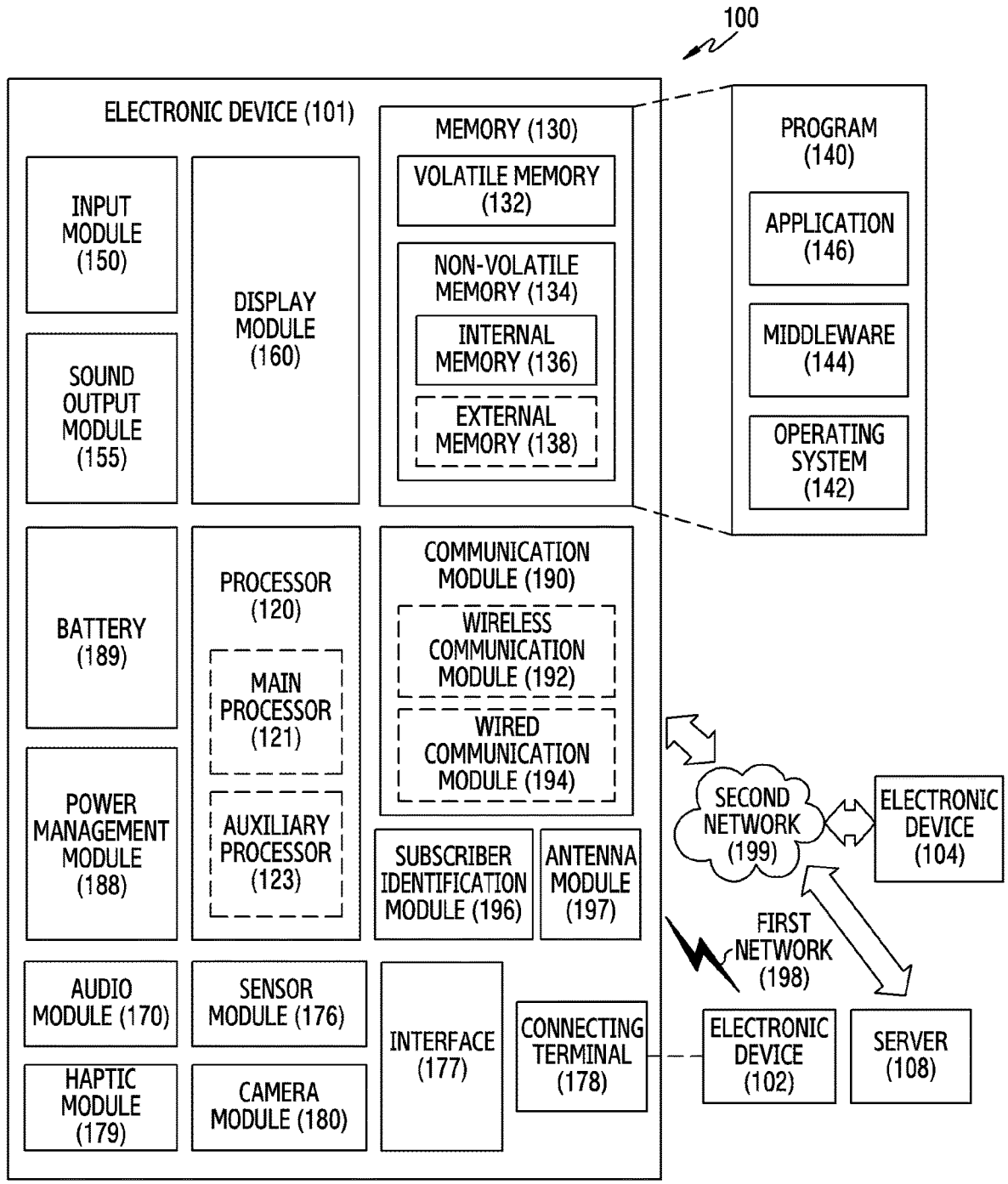
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The memory 130 may include input data or output data of tasks for performing machine learning, a neural network algorithm for performing the tasks, a target function, and relevant instructions.

The memory 130 may store, for example, instructions or data related to at least one other component of the electronic device 101. The instruction may be executed by at least one of the processor or the image processing module. The instruction may include at least one of a collection instruction related to collecting a candidate image, a display instruction related to displaying a candidate image, an analysis instruction related to analyzing a selected candidate image, or a provision instruction related to creating and providing at least one recommended image based on the analysis result, or a provision instruction related to providing the selected image.

The collection instruction may be, for example, an instruction used in collecting a candidate image using at least one of the communication module 190 or the camera. For example, the collection instruction may include an instruction for accessing the server 108 or the external electronic device 102 or 104 according to a scheduled setting or a user input, an instruction related to receiving a candidate image list of the server 108 or the external electronic device accessed, an instruction for requesting and collecting the selected candidate image according to a user input, and the like. The analysis instruction may include, for example, a region of interest (ROI) centered image analysis instruction, a user context based image analysis instruction, and the like. At least one instruction included in the above-described analysis instruction may be used to candidate image application according to a setting or a user input. The provision instruction may include at least one of an instruction for recommending an ROI centered image and providing a preview, an instruction for recommending an image based on a screen property to be set, an instruction for recommending by exceeding an actual image, an instruction for displaying a margin if the margin is included in the modified image, an instruction for recommending an image based on a screen type of the electronic device, and an instruction for applying a designated filter in image recommendation.

Although not depicted in the drawing, the memory 130 may store an analysis database, and an image database. The analysis database may store at least one instruction or at least one program related to the candidate image analysis. The analysis database may store, for example, an analysis algorithm for distinguishing and classifying candidate images based on an object. The analysis algorithm may distinguish, for example, a background object, a person object, a thing object, and an animal object of the candidate image. In this regard, the analysis database may store texture information or feature point information for distinguishing a person, a thing, an animal, and the like. Also, the analysis database may store feature point information or texture information for distinguishing a human face, an animal face, and the like. The image database may store at least one candidate image. For example, the image database may store at least one candidate image applied to a lock screen, a home screen, a designated application execution screen, and so on. The candidate image stored in the image database may be collected through a camera, or may be received from an external electronic device or a server as described earlier. According to various embodiments, the image database may store a recommended image created based on a specific candidate image. The image database may store device information of the electronic device 101 or the external electronic device 102. In addition, the image database may store information of the selected images applied to the electronic device 101 or the external electronic device 102.

Figure 2A:
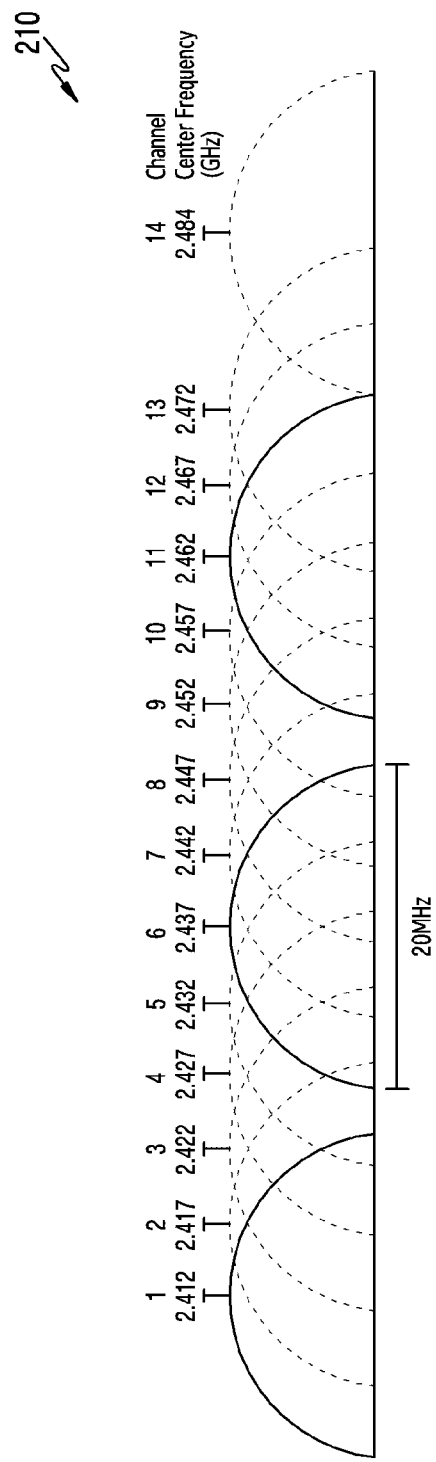
FIG. 2A is a diagram illustrating an example of a channel per bandwidth according to various embodiments.

FIG. 2A is a diagram illustrating an example 210 of a channel per bandwidth according to various embodiments. An electronic device of FIG. 2A may include the electronic device 101 of FIG. 1. An external electronic device of FIG. 2A may include the electronic device 102 of FIG. 1.

Referring to FIG. 2A, the example of the channel per bandwidth through which the electronic device 101 performs a wireless communication connection with the external electronic device 102 is illustrated, according to an embodiment. According to an embodiment, if the electronic device 101 performs the wireless communication connection with the external electronic device 102 supporting a band of 2.4 GHz, it may perform the wireless communication connection using a bandwidth of 20 MHz. According to an embodiment, the channel having the bandwidth of 20 MHz may, for example, be defined as 14 channels in total from a channel 1 to a channel 14.

According to an embodiment, if the electronic device 101 performs the wireless communication connection with the external electronic device 102 supporting the band of 2.4 GHz, it may perform the wireless communication connection using the bandwidth of 40 MHz. According to an embodiment, the channel having the bandwidth of 40 MHz may be defined by combining two channels having the bandwidth of 20 MHz. According to an embodiment, the channel having the bandwidth of 40 MHz may be defined by combining the channel 1 and the channel 5 having the bandwidth of 20 MHz in FIG. 2A. According to an embodiment, the channel having the bandwidth of 40 MHz may be defined by combining the channel 9 and the channel 13 having the bandwidth of 20 MHz in FIG. 2A.

Figure 2B:
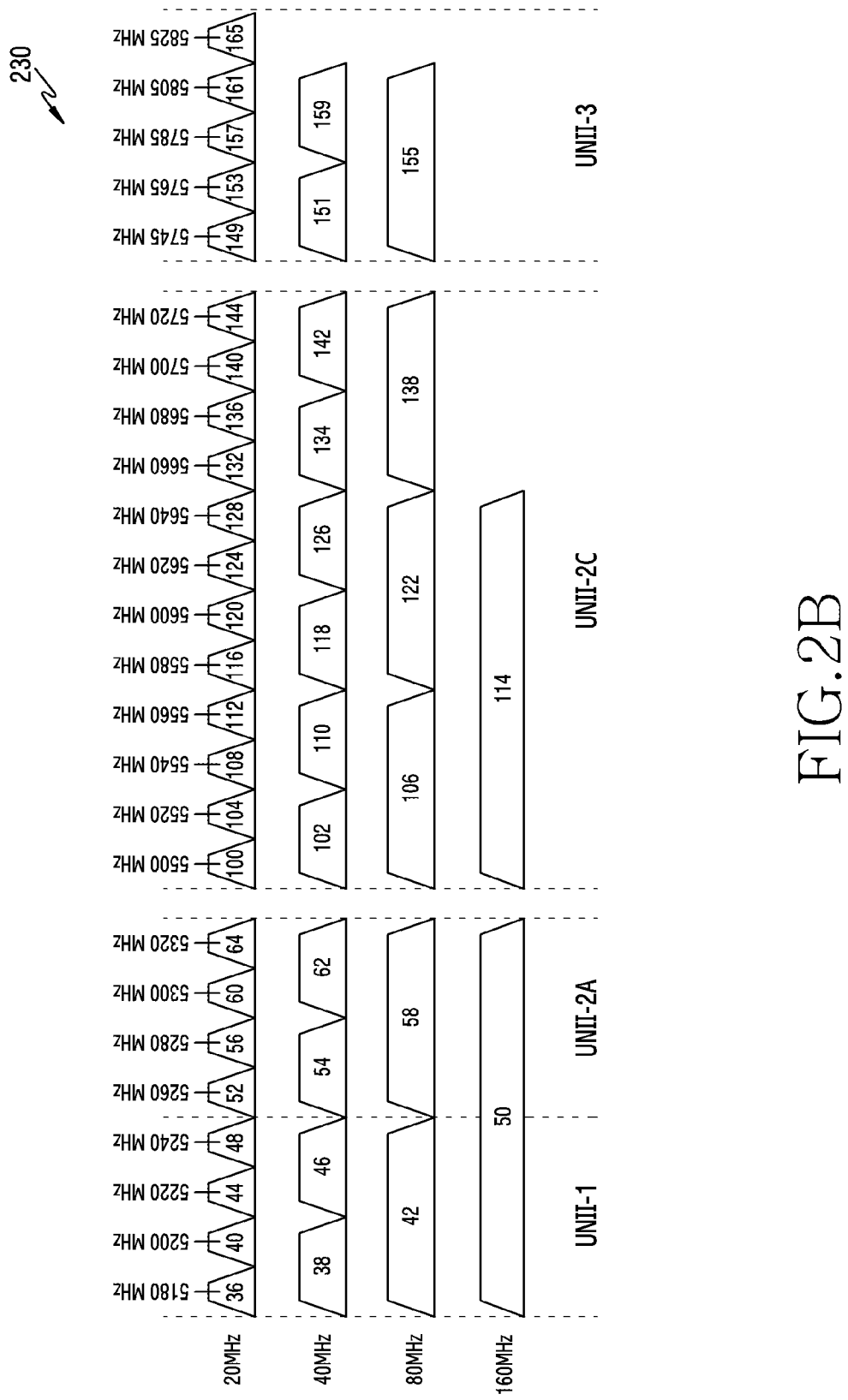
FIG. 2B is a diagram illustrating an example of a channel per bandwidth according to various embodiments.

FIG. 2B is a diagram illustrating an example 230 of the channel per bandwidth according to various embodiments. The electronic device of FIG. 2B may include the electronic device 101 of FIG. 1. The external electronic device of FIG. 2B may include the electronic device 102 of FIG. 1.

Referring to FIG. 2B, according to an embodiment, the example of the channel per bandwidth through which the electronic device 101 performs the wireless communication connection with the external electronic device 102 is illustrated. According to an embodiment, if the electronic device 101 performs the wireless communication connection with the external electronic device 102 supporting the band of 5 GHZ, it may perform the wireless communication connection using at least one bandwidth of 20 MHz, 40 MHz, 80 MHz, or 160 MHz. According to an embodiment, if the electronic device 101 performs the wireless communication connection with the external electronic device 102 based on the band of 5 GHZ, it may perform the wireless communication connection based on at least one channel of 25 channels having the bandwidth of 20 MHz. According to an embodiment, if the electronic device 101 performs the wireless communication connection with the external electronic device 102 based on the band of 5 GHz, it may perform the wireless communication connection based on at least one channel of 12 channels having the bandwidth of 40 MHz. According to an embodiment, if the electronic device 101 performs the wireless communication connection with the external electronic device 102 based on the band of 5 GHz, it may perform the wireless communication connection based on at least one channel of six channels having 80 MHz bandwidth. According to an embodiment, if the electronic device 101 performs the wireless communication connection with the external electronic device 102 based on the band of 5 GHZ, it may perform the wireless communication connection based on one of two channels having the bandwidth of 160 MHz.

Figure 2C:
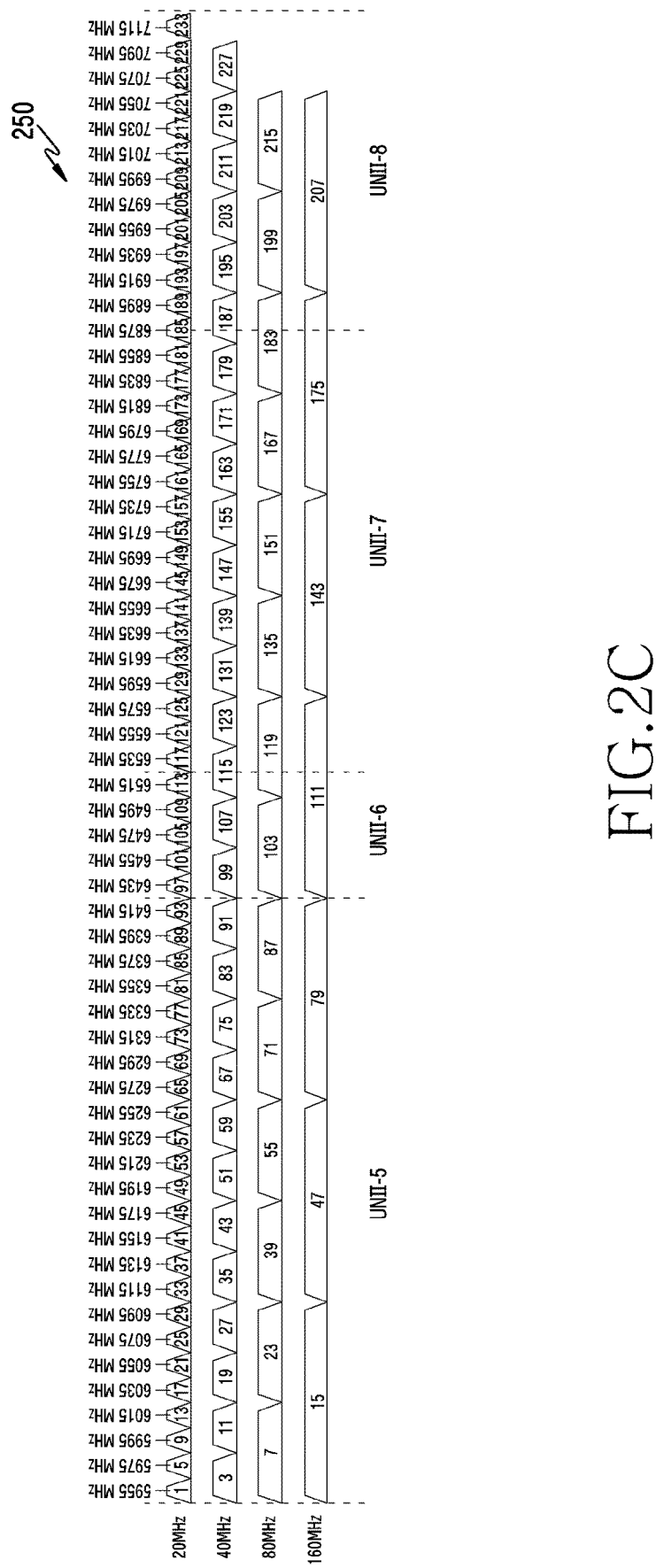
FIG. 2C is a diagram illustrating an example of a channel per bandwidth according to various embodiments.

FIG. 2C is a diagram illustrating an example 250 of the channel per bandwidth according to various embodiments. The electronic device of FIG. 2C may include the electronic device 101 of FIG. 1. The external electronic device of FIG. 2C may include the electronic device 102 of FIG. 1.

Referring to FIG. 2C, according to an embodiment, the example of the channel per bandwidth through which the electronic device 101 performs the wireless communication connection with the external electronic device 102 is illustrated.

According to an embodiment, if the electronic device 101 performs the wireless communication connection with the external electronic device 102 supporting the band of 6 GHz, it may perform the wireless communication connection using at least one bandwidth of 20 MHz, 40 MHz, 80 MHz, or 160 MHz. According to an embodiment, if the electronic device 101 performs the wireless communication connection with the external electronic device 102 based on the band of 6 GHz, it may perform the wireless communication connection based on at least one channel of 59 channels having the bandwidth of 20 MHz. According to an embodiment, if the electronic device 101 performs the wireless communication connection with the external electronic device 102 based on the band of 6 GHZ, it may perform the wireless communication connection based on at least one channel of 29 channels having the bandwidth of 40 MHz. According to an embodiment, if the electronic device 101 performs the wireless communication connection with the external electronic device 102 based on the band of 6 GHZ, it may perform the wireless communication connection based on at least one channel of 14 channels having 80 MHz bandwidth. According to an embodiment, if the electronic device 101 performs the wireless communication connection with the external electronic device 102 based on the band of 6 GHZ, it may perform the wireless communication connection based on one of seven channels having the bandwidth of 160 MHz.

Figure 3:
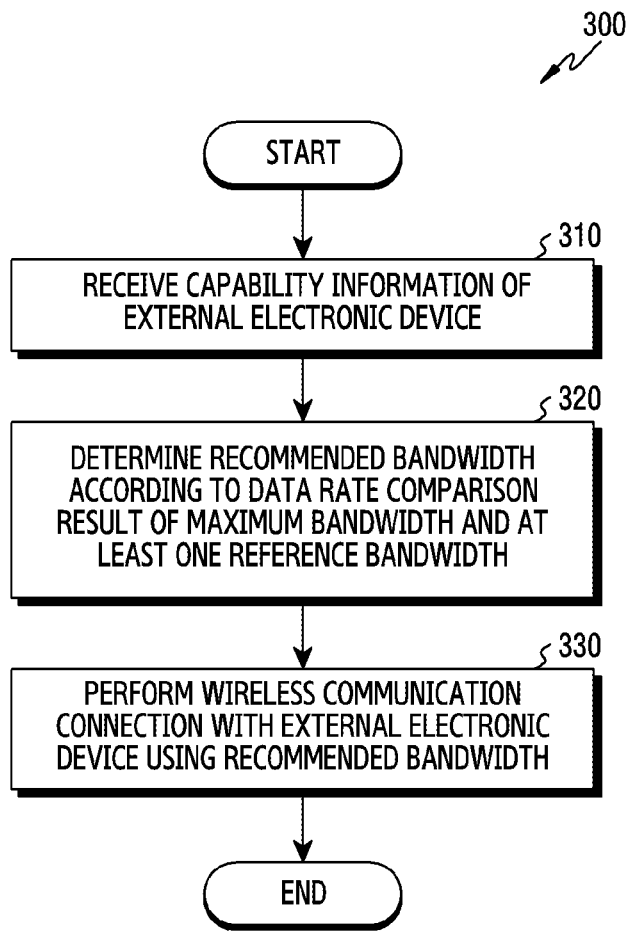
FIG. 3 is a flowchart illustrating an example operation of an electronic device for determining a recommended bandwidth according to various embodiments.

FIG. 3 is a flowchart 300 illustrating example operation of an electronic device for determining a recommended bandwidth according to various embodiments. The electronic device of FIG. 3 may include the electronic device 101 of FIG. 1. An external electronic device of FIG. 3 may include the electronic device 102 of FIG. 1.

Referring to FIG. 3, in operation 310, according to an embodiment, the electronic device 101 may receive capability information of the external electronic device 102.

According to an embodiment, the electronic device 101 may receive a signal for establishing a wireless communication connection from the external electronic device 102. According to an embodiment, the signal for establishing the wireless communication connection may include the capability information of the external electronic device 102. According to an embodiment, the signal received from the external electronic device 102 may indicate at least one of a beacon signal or a probe response signal. According to an embodiment, based on the received capability information of the external electronic device 102, the electronic device 101 may identify a frequency band, a primary channel, a maximum supportable bandwidth, or standard information of the external electronic device 102. According to an embodiment, if the external electronic device 102 operates in the 2.4 GHZ band, the electronic device 101 may identify whether the maximum supportable bandwidth of the external electronic device 102 is 40 MHz, based on the capability information of the external electronic device 102. According to an embodiment, if the external electronic device 102 operates in the 5 GHz band, the electronic device 101 may identify whether the maximum supportable bandwidth of the external electronic device 102 is 160 MHz, based on the capability information of the external electronic device 102. According to an embodiment, if the external electronic device 102 operates in the 6 GHz band, the electronic device 101 may identify whether the maximum supportable bandwidth of the external electronic device 102 is 160 MHz, based on the capability information of the external electronic device 102.

According to an embodiment, the electronic device 101 may identify at least one reference bandwidth, based on the capability information of the external electronic device 102. According to an embodiment, the electronic device 101 may determine at least one reference bandwidth using the primary channel, and the maximum supported bandwidth of the capability information of the external electronic device 102. For example, if the maximum supportable bandwidth of the external electronic device 102 is 160 MHz, the electronic device 101 may determine an 80 MHz bandwidth including the primary channel within 160 MHz as a first reference bandwidth. According to an embodiment, if the maximum supportable bandwidth of the external electronic device 102 is 160 MHZ, the electronic device 101 may determine an 80 MHz bandwidth not including the primary channel within 160 MHz as a second reference bandwidth.

In operation 320, according to an embodiment, the electronic device 101 may determine the recommended bandwidth according to a data rate comparison result of the maximum bandwidth and at least one reference bandwidth. According to an embodiment, the electronic device 101 may determine at least one reference bandwidth, based on the maximum bandwidth. According to an embodiment, the electronic device 101 may calculate an interference amount of the maximum bandwidth. According to an embodiment, the electronic device 101 may calculate the interference amount of at least one reference bandwidth. The interference amount may indicate a numerical expression of an influence of another electronic device using a channel of an adjacent frequency band on the electronic device 101 in a corresponding bandwidth. According to an embodiment, the electronic device 101 may calculate a data rate through the maximum bandwidth based on the interference amount of the maximum bandwidth. According to an embodiment, the electronic device 101 may calculate a data rate through the at least one reference bandwidth based on the interference amount of the at least one reference bandwidth. According to an embodiment, the electronic device 101 may compare the data rate through the maximum bandwidth and the data rate through at least one reference bandwidth. According to an embodiment, the electronic device 101 may determine the recommended bandwidth for performing the wireless communication connection with the external electronic device 102, based on the comparison result of the data rate. According to an embodiment, the electronic device 101 may determine either the maximum bandwidth or the at least one reference bandwidth as the recommended bandwidth, based on the comparison result.

In operation 330, according to an embodiment, the electronic device 101 may perform the wireless communication connection with the external electronic device 102 using the recommended bandwidth. According to an embodiment, the external electronic device 102 is a device which interconnects the electronic device 101 and an external server, and may refer, for example, to an access point (AP)', a 'wireless point', or a wireless fidelity (Wi-Fi) router' or other term having an equivalent technical meaning.

Figure 4:
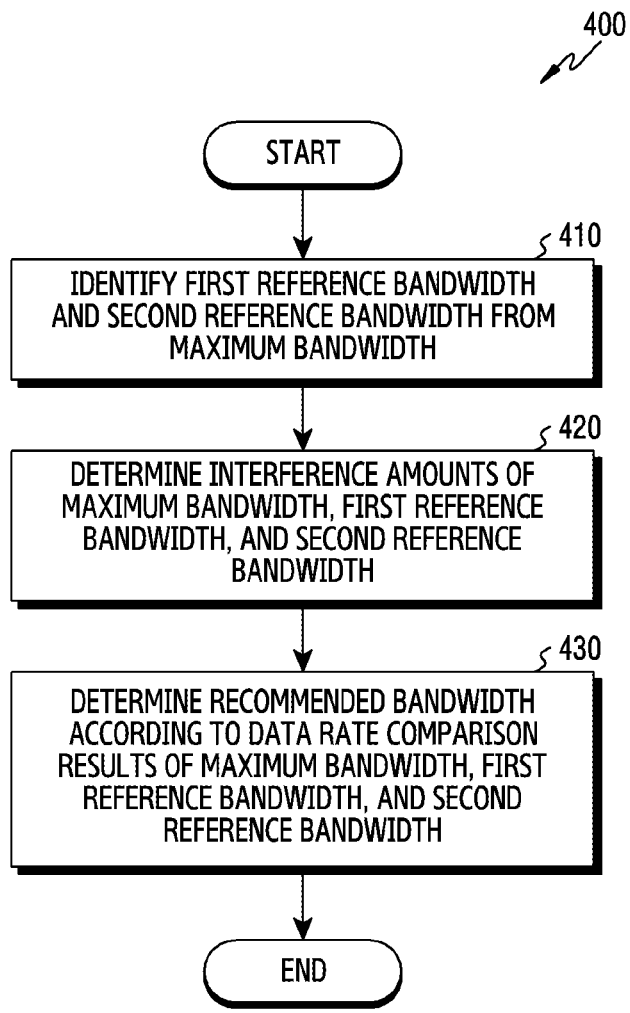
FIG. 4 is a flowchart illustrating an example operation of an electronic device for determining a recommended bandwidth based on a maximum bandwidth and at least one reference bandwidth according to various embodiments.

FIG. 4 is a flowchart 400 illustrating example operation of an electronic device for determining a recommended bandwidth based on a maximum bandwidth and at least one reference bandwidth according to various embodiments. The electronic device of FIG. 4 may include the electronic device 101 of FIG. 1. An external electronic device of FIG. 4 may include the electronic device 102 of FIG. 1.

Referring to FIG. 4, in operation 410, according to an embodiment, the electronic device 101 may identify a first reference bandwidth and a second reference bandwidth from the maximum bandwidth. According to an embodiment, the electronic device 101 may acquire capability information of the external electronic device 102, by identifying a media access control (MAC) header of a signal received from the external electronic device 102. According to an embodiment, the electronic device 101 may identify maximum supportable bandwidth information and primary channel information of the external electronic device 102 from the capability information of the external electronic device 102. According to an embodiment, the electronic device 101 may determine at least one reference bandwidth, based on the maximum bandwidth information and the primary channel information. According to an embodiment, the electronic device 101 may determine a frequency bandwidth including the primary channel within the maximum bandwidth as the first reference bandwidth. According to an embodiment, the electronic device 101 may determine a frequency bandwidth not including the primary channel within the maximum bandwidth as the second reference bandwidth. According to an embodiment, the electronic device 101 may receive a signal of the external electronic device 102 through the frequency bandwidth including the primary channel. The signal of the external electronic device 102 may indicate either a beacon signal or a probe response signal. According to an embodiment, the electronic device 101 may determine one of corresponding bandwidths below the maximum supportable bandwidth of the external electronic device 102 as at least one reference bandwidth. For example, if the maximum supportable bandwidth of the external electronic device 102 is 160 MHz, the electronic device 101 may determine one of 20 MHZ, 40 MHz, or 80 MHz bandwidths corresponding to 160 MHz or less as at least one reference bandwidth. According to an embodiment, if the maximum supported bandwidth of the external electronic device 102 is 160 MHz, the electronic device 101 may determine an 80 MHz bandwidth including the primary channel within 160 MHz as the first reference bandwidth. According to an embodiment, if the maximum supportable bandwidth of the external electronic device 102 is 160 MHz, the electronic device 101 may determine an 80 MHz bandwidth not including the primary channel within 160 MHz as the second reference bandwidth.

In operation 420, according to an embodiment, the electronic device 101 may determine interference amounts of the maximum bandwidth, the first reference bandwidth, and the second reference bandwidth. According to an embodiment, the electronic device 101 may determine a ratio of a time during which an energy level in the corresponding bandwidth exceeds a threshold for a designated time as the interference amount of the corresponding bandwidth. According to an embodiment, the electronic device 101 may determine a ratio of a time during which an energy level of the first reference bandwidth exceeds a threshold for a designated time as the interference amount of the first reference bandwidth. According to an embodiment, the electronic device 101 may determine the interference amount of the first reference bandwidth as a first interference amount. For example, if the time during which the energy level of the first reference bandwidth exceeds the threshold (e.g., −80 dBm) for 1 second is 300 ms, the electronic device 101 may determine the first interference amount as 0.3. According to an embodiment, the electronic device 101 may determine a ratio of a time during which an energy level of the second reference bandwidth exceeds a threshold for a designated time as the interference amount of the second reference bandwidth. According to an embodiment, the electronic device 101 may determine the interference amount of the second reference bandwidth as the second interference amount. For example, if the time during which the energy level of the second reference bandwidth exceeds the threshold (e.g., −80 dBm) for 1 second is 700 ms, the electronic device 101 may determine the second interference amount as 0.7. According to an embodiment, the electronic device 101 may determine a ratio of a time during which an energy level of the maximum bandwidth exceeds a threshold for a designated time as the interference amount of the maximum bandwidth. According to an embodiment, the electronic device 101 may determine the interference amount of the maximum bandwidth as the third interference amount. For example, if the time for which the energy level of the maximum bandwidth exceeds the threshold (e.g., −80 dBm) for 1 second is 500 ms, the electronic device 101 may determine the third interference amount as 0.5. According to an embodiment, the electronic device 101 may determine the third interference amount of the maximum bandwidth based on the first interference amount of the first reference bandwidth and the second interference amount of the second reference bandwidth. According to an embodiment, the electronic device 101 may determine a greater value of the first interference amount of the first reference bandwidth and the second interference amount of the second reference bandwidth as the third interference amount of the maximum bandwidth.

In operation 430, according to an embodiment, the electronic device 101 may determine a recommended bandwidth according to a data rate comparison result of the maximum bandwidth, the first reference bandwidth and the second reference bandwidth. According to an embodiment, based on the interference amount of the bandwidth, the electronic device 101 may determine the data rate of the signal through the corresponding bandwidth. According to an embodiment, the electronic device 101 may determine a data rate of a signal through the first reference bandwidth based on the first interference amount of the first reference bandwidth. According to an embodiment, the data rate of the signal through the first reference bandwidth may be expressed as [Equation 1] below.

$$\text{data rate of signal through first reference bandwidth} = (\text{link speed of first reference bandwidth}) * (1 - \text{first interference amount}) \quad [\text{Equation 1}]$$

According to an embodiment, the link speed of the first reference bandwidth may be determined as a supportable maximum data rate in the corresponding bandwidth based on institute of electrical and electronics engineers (IEEE) standard.

According to an embodiment, the electronic device 101 may determine the data rate of the signal through the second reference bandwidth based on the second interference amount of the second reference bandwidth. According to an embodiment, the data rate of the signal through the second reference bandwidth may be expressed as [Equation 2] below.

$$\text{data rate of signal through second reference bandwidth} = (\text{link speed of second reference bandwidth}) * (1 - \text{second interference amount}) \quad [\text{Equation 2}]$$

According to an embodiment, the link speed of the second reference bandwidth may be determined as a supportable maximum data rate in the corresponding bandwidth based on the IEEE standard.

According to an embodiment, the electronic device 101 may determine the data rate of the signal through the maximum bandwidth based on the third interference amount of the maximum bandwidth. According to an embodiment, the data rate of the signal through the maximum bandwidth may be expressed as [Equation 3] below.

$$\text{data rate of signal through maximum bandwidth} = (\text{link speed of maximum bandwidth}) * (1 - \text{third interference amount}) \quad [\text{Equation 3}]$$

According to an embodiment, the link speed of the maximum bandwidth may be determined as a supportable maximum data rate in the corresponding bandwidth based on the IEEE standard.

According to an embodiment, the electronic device 101 may compare the data rate of the signal through at least one reference bandwidth and the data rate of the signal through the maximum bandwidth. According to an embodiment, the signal data rate through the at least one reference bandwidth may include the signal data rate through the first reference bandwidth and the signal data rate through the second reference bandwidth. According to an embodiment, the electronic device 101 may determine a bandwidth having the fastest data rate as the recommended bandwidth based on the data rate comparison result of the maximum bandwidth and the at least one reference bandwidth.

Figure 5:
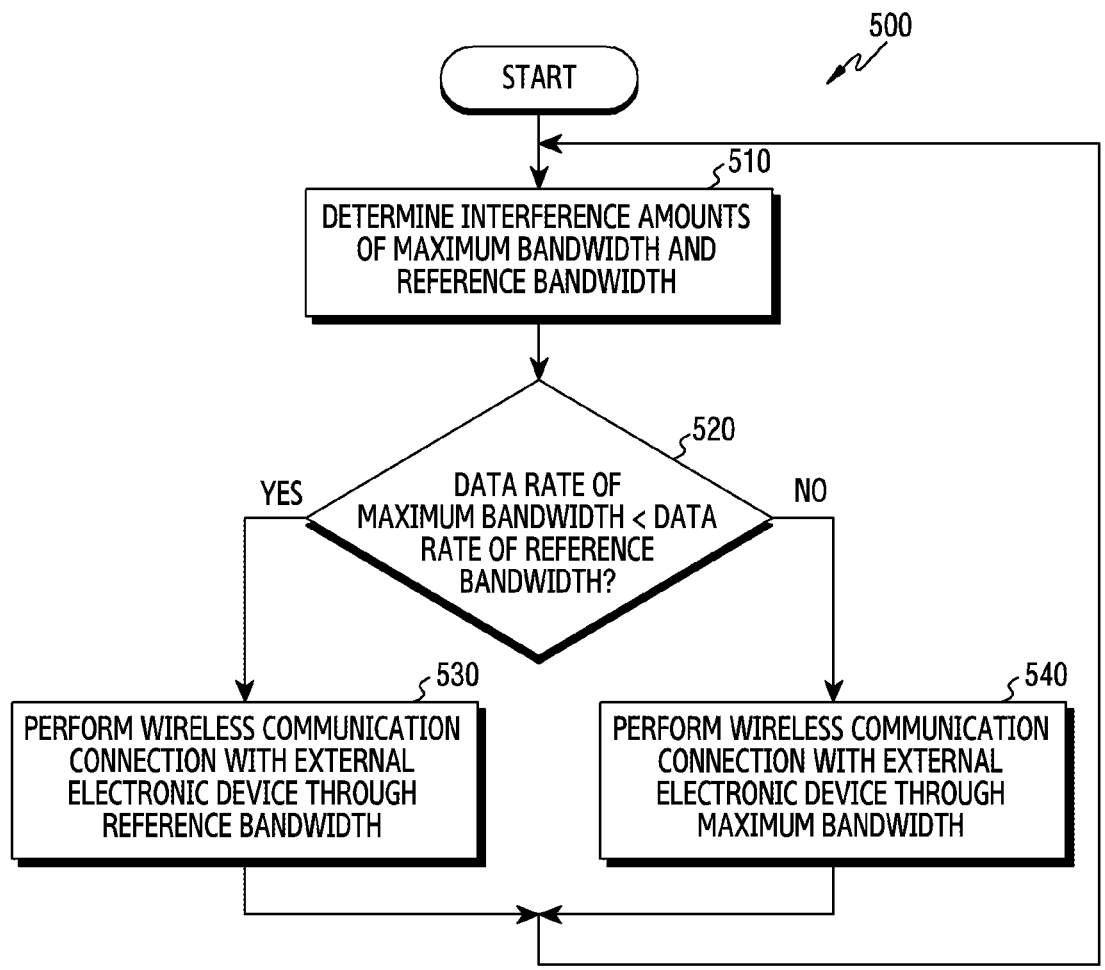
FIG. 5 is a flowchart illustrating an example operation of an electronic device for periodically determining a recommended bandwidth based on a maximum bandwidth and at least one reference bandwidth according to various embodiments.

FIG. 5 is a flowchart 500 illustrating example operation of an electronic device for periodically determining a recommended bandwidth based on a maximum bandwidth and at least one reference bandwidth according to various embodiments. The electronic device of FIG. 5 may include the electronic device 101 of FIG. 1. An external electronic device of FIG. 5 may include the electronic device 102 of FIG. 1.

Referring to FIG. 5, in operation 510, according to an embodiment, the electronic device 101 may determine interference amounts of a maximum bandwidth and a reference bandwidth. According to an embodiment, if performing a wireless communication connection using the maximum bandwidth, the electronic device 101 may determine the interference amount in the maximum bandwidth. According to an embodiment, if performing a wireless communication connection using the maximum bandwidth, the electronic device 101 may determine the interference amount in at least one reference bandwidth. According to an embodiment, if identifying that the wireless communication connection is performed using at least one reference bandwidth, the electronic device 101 may determine the interference amount in the maximum bandwidth. According to an embodiment, if identifying that the wireless communication connection is performed using the at least one reference bandwidth, the electronic device 101 may determine the interference amount in the at least one reference bandwidth.

According to an embodiment, the electronic device 101 may determine the interference amount in the maximum bandwidth and the interference amount in at least one reference bandwidth by applying the interference amount determining method of FIG. 4. For example, the electronic device 101 may determine the ratio of the time during which the energy level in the maximum bandwidth exceeds the threshold for the designated time as the interference amount in the maximum bandwidth. For example, the electronic device 101 may determine the ratio of the time during which the energy level in the at least one reference bandwidth exceeds the threshold for the designated time as the interference amount in the at least one reference bandwidth. According to an embodiment, the at least one reference bandwidth may include the first reference bandwidth including the primary channel or the second reference bandwidth not including the primary channel.

In operation 520, according to an embodiment, the electronic device 101 may identify whether the data rate of the maximum bandwidth is slower (e.g., less) than the data rate of the reference bandwidth. According to an embodiment, the electronic device 101 may determine the data rate in the maximum bandwidth and the data rate in at least one reference bandwidth, by applying the data rate determining method of FIG. 4. According to an embodiment, the electronic device 101 may determine the signal data rate through the maximum bandwidth based on the interference amount of the maximum bandwidth. According to an embodiment, the electronic device 101 may determine the signal data rate through the at least one reference bandwidth based on the interference amount of the at least one reference bandwidth. According to an embodiment, the electronic device 101 may compare the signal data rate through at least one reference bandwidth and the signal data rate through the maximum bandwidth. According to an embodiment, based on the comparison result, the electronic device 101 may identify whether the data rate of the maximum bandwidth is slower than the data rate of at least one reference bandwidth. According to an embodiment, if the data rate of the maximum bandwidth is slower than the data rate of the at least one reference bandwidth, the electronic device 101 may determine the recommended bandwidth as the at least one reference bandwidth.

According to an embodiment, if the data rate of the maximum bandwidth is faster (e.g., greater) than the data rate of at least one reference bandwidth, the electronic device 101 may determine the recommended bandwidth as the maximum bandwidth.

In operation 530, according to an embodiment, the electronic device 101 may perform a wireless communication connection with the external electronic device 102 through the reference bandwidth. According to an embodiment, if identifying that the data rate of the maximum bandwidth is slower (e.g., less) than the data rate of the at least one reference bandwidth, the electronic device 101 may determine the recommended bandwidth as the at least one reference bandwidth. According to an embodiment, if using the maximum bandwidth in a previous wireless communication connection, the electronic device 101 may determine the recommended bandwidth as at least one reference bandwidth, based on the data rate comparison result. According to an embodiment, the electronic device 101 may perform a wireless communication connection with the external electronic device 102 based on the determined recommended bandwidth. According to an embodiment, the electronic device 101 may determine the recommended bandwidth based on a data rate comparison result between the maximum bandwidth and at least one reference bandwidth at preset intervals.

In operation 540, according to an embodiment, the electronic device 101 may perform a wireless communication connection through the maximum bandwidth. According to an embodiment, if identifying that the data rate of the maximum bandwidth is faster (e.g., greater) than the data rate of at least one reference bandwidth, the electronic device 101 may determine the recommended bandwidth as the maximum bandwidth. According to an embodiment, if using the reference bandwidth in a previous wireless communication connection, the electronic device 101 may determine the recommended bandwidth as the maximum bandwidth, based on the comparison result of the data rate. According to an embodiment, the electronic device 101 may perform a wireless communication connection with the external electronic device 102 based on the determined recommended bandwidth. According to an embodiment, the electronic device 101 may determine the recommended bandwidth based on a data rate comparison result between the maximum bandwidth and at least one reference bandwidth at preset intervals.

Figure 6A:
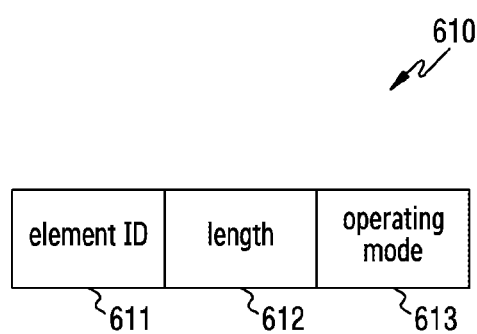
FIG. 6A is a diagram illustrating an example of a frame used to change from an existing bandwidth to a recommended bandwidth according to various embodiments.

FIG. 6A is a diagram illustrating an example 610 of a frame used to change from an existing bandwidth to a recommended bandwidth according to various embodiments. An electronic device of FIG. 6A may include the electronic device 101 of FIG. 1. An external electronic device of FIG. 6A may include the electronic device 102 of FIG. 1.

Referring to FIG. 6A, according to an embodiment, the electronic device 101 may change the recommended bandwidth through a frame (e.g., an operating mode notification (OMN) frame) defined in IEEE 802.11ac standard. According to an embodiment, the frame defined in the IEEE 802.11ac standard may include an element ID 611 field, a length 612 field, and an operating mode 613 field. According to an embodiment, the electronic device 101 may change the recommended bandwidth, based on the operating mode 613 field.

Figure 6B:
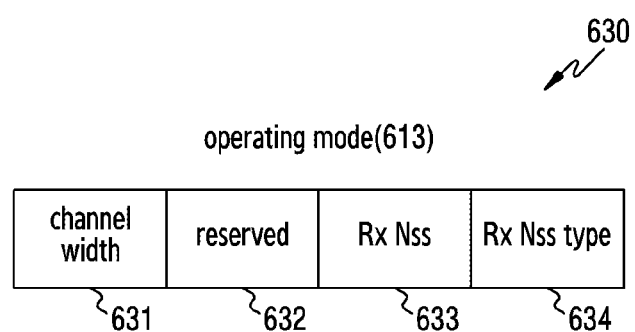
FIG. 6B is a diagram illustrating an example of frame fields used to change from an existing bandwidth to a recommended bandwidth according to various embodiments.

FIG. 6B is a diagram illustrating an example 630 of frame fields used to change from the existing bandwidth to the recommended bandwidth according to various embodiments. The electronic device of FIG. 6B may include the electronic device 101 of FIG. 1. The external electronic device of FIG. 6B may include the electronic device 102 of FIG. 1.

Referring to FIG. 6B, according to an embodiment, the electronic device 101 may change the recommended bandwidth, based on a subfield of the operating mode 613 field of the frame (e.g., an OMN frame) defined in the IEEE 802.11ac standard. According to an embodiment, the operating mode 613 field of the frame defined in the IEEE 802.11ac standard may include at least one of a channel width 631 field, a reserved 632 field, a receive (Rx) number of spatial streams (Nss) 633 field, an Rx Nss type 634 field or a combination of them as its subfield. According to an embodiment, the electronic device 101 may change the recommended bandwidth, based on the channel width 631 field. According to an embodiment, the electronic device 101 may change the recommended bandwidth, by changing a value of the channel width 631 field. According to an embodiment, the electronic device 101 may transmit the frame including the changed recommendation bandwidth to the external electronic device 102.

Figure 6C:
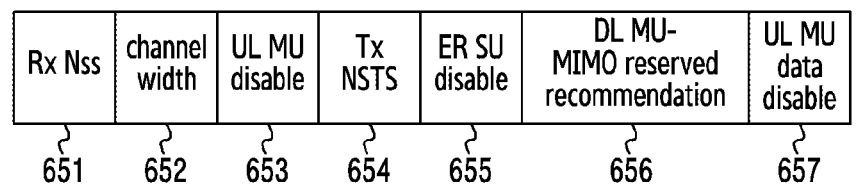
FIG. 6C is a diagram illustrating an example of a frame used to change from an existing bandwidth to a recommended bandwidth according to various embodiments.

FIG. 6C is a diagram illustrating an example 650 of the frame used to change from the existing bandwidth to the recommended bandwidth according to various embodiments. The electronic device of FIG. 6C may include the electronic device 101 of FIG. 1. The external electronic device of FIG. 6C may include the electronic device 102 of FIG. 1.

Referring to FIG. 6C, according to an embodiment, the electronic device 101 may change the recommended bandwidth through a frame (e.g., an operating mode indication (OMI) frame) defined in the IEEE 802.11ax standard. According to an embodiment, the frame defined in the IEEE 802.11ax standard may include at least one of an Rx Nss 651 field, a channel width 652 field, a uplink (UL) multi-user (MU) disable 653 field, a transmit (Tx) number of spatial streams (NSTS) 654 field, and an extended range (ER) single-user (SU) disable 655 field, a DL MU-multiple input multiple output (MIMO) reserved recommendation 656 field, a UL MU data disable 657 field, or any combination thereof. According to an embodiment, the electronic device 101 may change the recommended bandwidth, based on the channel width 652 field. According to an embodiment, the electronic device 101 may change the recommended bandwidth, by changing a value of the channel width 652 field. According to an embodiment, the electronic device 101 may transmit the frame including the changed recommendation bandwidth to the external electronic device 102.

Figure 7:
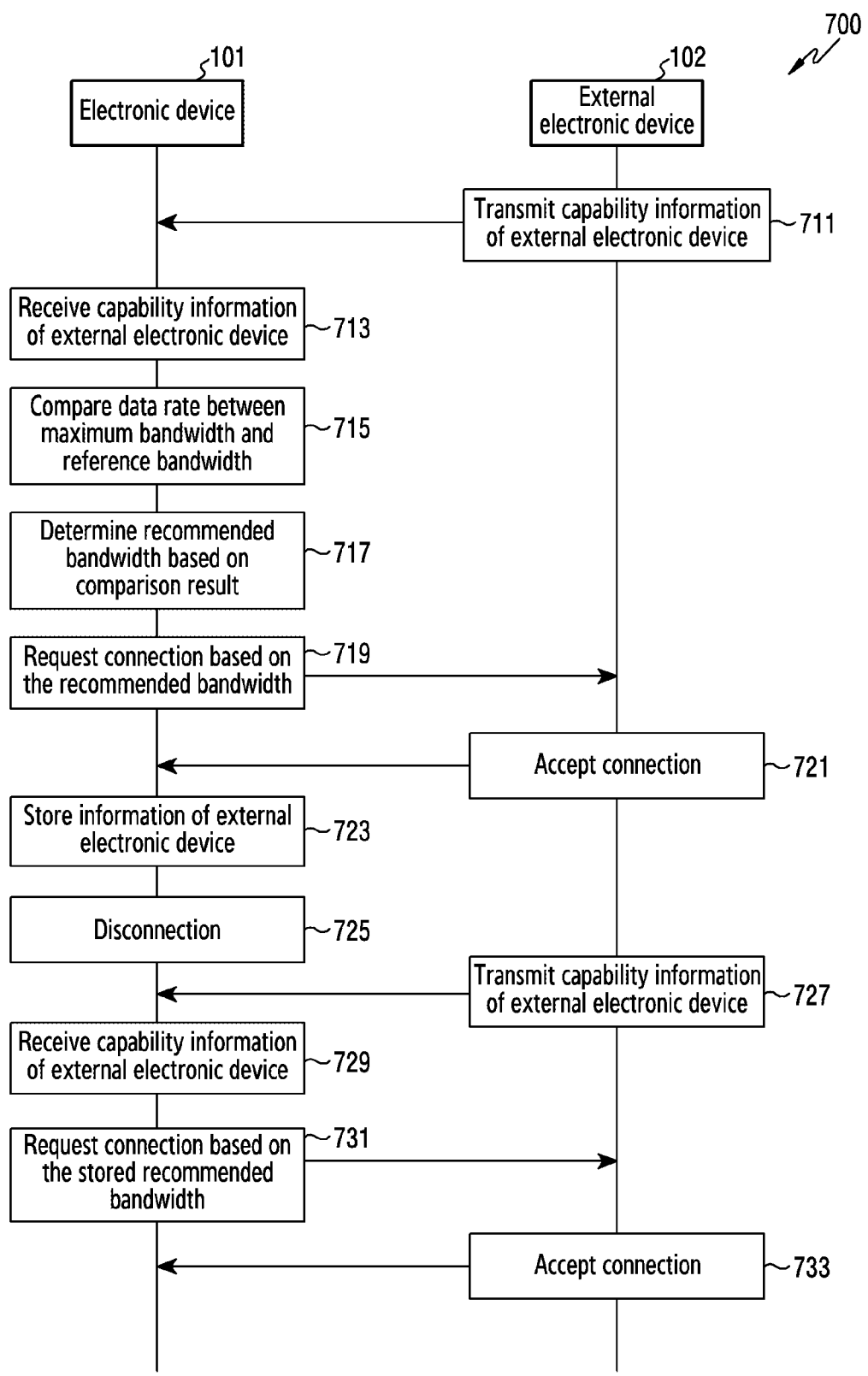
FIG. 7 is a signal flow diagram illustrating example operation of an electronic device for performing a wireless communication connection based on a stored recommended bandwidth according to various embodiments.

FIG. 7 is a signal flow diagram 700 illustrating example operation of an electronic device for performing a wireless communication connection based on a stored recommended bandwidth according to various embodiments. The electronic device of FIG. 7 may include the electronic device 101 of FIG. 1. An external electronic device of FIG. 7 may include the electronic device 102 of FIG. 1.

Referring to FIG. 7, in operation 711, according to an embodiment, the external electronic device 102 may transmit capability information of the external electronic device. According to an embodiment, the external electronic device 102 may transmit a signal including the capability information of the external electronic device 102. According to an embodiment, the signal including the capability information of the external electronic device 102 may include either a beacon signal or a probe response signal. The capability information of the external electronic device 102 may include at least one information of a frequency band, a primary channel, a supportable bandwidth, and a standard of the external electronic device 102.

In operation 713, according to an embodiment, the electronic device 101 may receive the capability information of the external electronic device 102. According to an embodiment, the electronic device 101 may identify information of the frequency band, the primary channel, the supportable bandwidth, or the standard of the external electronic device 102, based on the received capability information of the external electronic device 102. According to an embodiment, the electronic device 101 may identify the maximum supportable bandwidth of the external electronic device 102, based on the capability information of the external electronic device 102. According to an embodiment, the electronic device 101 may identify at least one reference bandwidth within the maximum bandwidth. According to an embodiment, the electronic device 101 may determine an interference amount in the maximum bandwidth, according to the method for determining the interference amount in the bandwidth of FIG. 4. According to an embodiment, the electronic device 101 may determine the interference amount in at least one reference bandwidth, according to the method of determining the interference amount in the bandwidth of FIG. 4.

In operation 715, according to an embodiment, the electronic device 101 may compare the data rate between the maximum bandwidth and at least one reference bandwidth. According to an embodiment, the electronic device 101 may determine the data rate of the maximum bandwidth, based on the interference amount in the maximum bandwidth. According to an embodiment, the electronic device 101 may determine the data rate of the maximum bandwidth, according to the method of determining the data rate of the bandwidth of FIG. 4. According to an embodiment, the electronic device 101 may determine the data rate of the at least one reference bandwidth, based on the interference amount in the at least one reference bandwidth. According to an embodiment, the electronic device 101 may determine the data rate of at least one reference bandwidth, according to the method of determining the data rate of the bandwidth of FIG. 4. According to an embodiment, the electronic device 101 may compare the data rate considering the interference amount in the maximum bandwidth and the data rate considering the interference amount in at least one reference bandwidth.

In operation 717, according to an embodiment, the electronic device 101 may determine a recommended bandwidth based on the comparison result. According to an embodiment, the electronic device 101 may determine the recommended bandwidth, based on the comparison result between the data rate of the maximum bandwidth and the data rate of at least one reference bandwidth. According to an embodiment, if the data rate of the maximum bandwidth is faster than the data rate of at least one reference bandwidth, the electronic device 101 may determine the maximum bandwidth as the recommended bandwidth. According to an embodiment, if the data rate of the maximum bandwidth is slower than the data rate of the at least one reference bandwidth, the electronic device 101 may determine the at least one reference bandwidth as the recommended bandwidth.

In operation 719, according to an embodiment, the electronic device 101 may request a wireless communication connection from the external electronic device 102 based on the recommended bandwidth. According to an embodiment, the electronic device 101 may transmit the request for performing the wireless communication connection based on the recommended bandwidth to the external electronic device 102.

In operation 721, according to an embodiment, the external electronic device 102 may accept the connection. According to an embodiment, the external electronic device 102 may transmit a signal of accepting the wireless communication connection based on the recommended bandwidth to the electronic device 101.

In operation 723, according to an embodiment, the electronic device 101 may store information of the external electronic device 102. According to an embodiment, the electronic device 101 may store the information of the external electronic device 102 in a storage (e.g., the memory 130 of FIG. 1) of the electronic device 101. According to an embodiment, the electronic device 101 may store the information of the external electronic device 102 in an external server (e.g., the server 108 of FIG. 1). According to an embodiment, if performing the wireless communication connection through the recommended bandwidth, the electronic device 101 may determine the data rate through the recommended bandwidth. According to an embodiment, the electronic device 101 may store data rate indicator information through the recommended bandwidth as the information of the external electronic device 102. According to an embodiment, the data rate indicator may include at least one of a downlink data rate indicator or an uplink data rate indicator. According to an embodiment, the electronic device 101 may store downlink data rate indicator information as the information of the external electronic device 102. According to an embodiment, the downlink data rate indicator may be expressed as [Equation 4] below.

$$I_{DL}=[\log_2 S_{DL}] \qquad \text{[Equation 4]}$$

According to an embodiment, $I_{DL}$ may denote the downlink data rate indicator. According to an embodiment, $S_{DL}$ may denote an actual downlink data rate. According to an embodiment, [x] may denote a maximum integer not exceeding x.

According to an embodiment, the electronic device 101 may store the uplink data rate indicator information as the information of the external electronic device 102. According to an embodiment, the uplink data rate indicator may be expressed as [Equation 5] below.

$$I_{UL}=[\log_2 S_{UL}] \qquad \text{[Equation 5]}$$

According to an embodiment, $I_{UL}$ may denote the uplink data rate indicator. According to an embodiment, $S_{UL}$ may denote an actual uplink data rate. According to an embodiment, [x] may denote the maximum integer not exceeding x.

According to an embodiment, the electronic device 101 may determine the data rate indicator, if a received signal strength indicator (RSSI) is equal to or greater than a threshold. According to an embodiment, the electronic device 101 may determine an average value of periodically measured data rates as the data rate indicator.

According to an embodiment, the information of the external electronic device 102 may include at least one of recommended bandwidth information, channel information, basic service set identifier (BSSID) information of the external electronic device 102, data rate indicator information, RSSI information or frequency band information.

According to an embodiment, the electronic device 101 may store the information of the external electronic device 102 in association with location information. According to an embodiment, the electronic device 101 may group information of the external electronic devices 102 which may be scanned according to the location information. According to an embodiment, the information of the external electronic devices 102 which may be scanned at the same location may be determined as one group.

According to an embodiment, the electronic device 101 may set the location information based on the BSSID information of the external electronic device 102. According to an embodiment, the electronic device 101 may set the location information based on a user input. According to an embodiment, the electronic device 101 may set the location information based on global positioning system (GPS) information or a cell ID. According to an embodiment, the electronic device 101 may store the information of the external electronic devices 102, based on the location information. According to an embodiment, the electronic device 101 may store the information of the external electronic devices 102 as the group per location, based on the location information.

According to an embodiment, the electronic device 101 may store the information of the external electronic devices 102 scannable at the same location as information of the external electronic devices 102 scannable at a first location.

In operation 725, the connection between the electronic device 101 and the external electronic device 102 may be released (e.g., disconnection), according to an embodiment. According to an embodiment, the electronic device 101 may be disconnected from the external electronic device 102 due to movement or a low signal quality of the electronic device 101 and/or the external electronic device 102.

In operation 727, according to an embodiment, the external electronic device 102 may transmit capability information of the external electronic device 102. According to an embodiment, the external electronic device 102 may transmit a signal including the capability information of the external electronic device 102 to the electronic device 101. According to an embodiment, the signal including the capability information of the external electronic device 102 may indicate either a beacon signal or a probe response signal.

In operation 729, according to an embodiment, the electronic device 101 may receive the capability information of the external electronic device 102. According to an embodiment, the electronic device 101 may receive the signal including the capability information of the external electronic device 102 from the external electronic device 102. According to an embodiment, the electronic device 101 may identify whether the external electronic device 102 previously performs a wireless communication connection with the electronic device 101 based on the transmitted capability information of the external electronic device 102. According to an embodiment, if identifying the external electronic device 102 as the device previously performing the wireless communication connection, the electronic device 101 may identify stored information of the corresponding external electronic device 102. The electronic device 101 may identify the recommended bandwidth stored for the wireless communication connection with the external electronic device 102 from the stored information.

In operation 731, according to an embodiment, the electronic device 101 may request a connection based on the stored recommended bandwidth. According to an embodiment, if identifying the external electronic device 102 as the device previously performing the wireless communication connection, the electronic device 101 may perform a wireless communication connection with the external electronic device 102 based on the stored recommended bandwidth.

In operation 733, according to an embodiment, the external electronic device 102 may accept the connection. According to an embodiment, the external electronic device 102 may transmit a signal of accepting the wireless communication connection based on the recommended bandwidth to the electronic device 101.

FIG. 7 illustrates an example of the transmission and reception paths for the wireless connection between the electronic device 101 and the external electronic device 102, but various changes may be made on FIG. 7. For example, various operations of FIG. 7 may be combined, further subdivided, or omitted, and an operation may be added according to a specific situation. For example, if receiving the capability information of the external electronic device 102 in operation 713, the electronic device 101 may identify whether the external electronic device 102 has previously performed a wireless communication connection.

Figure 8:
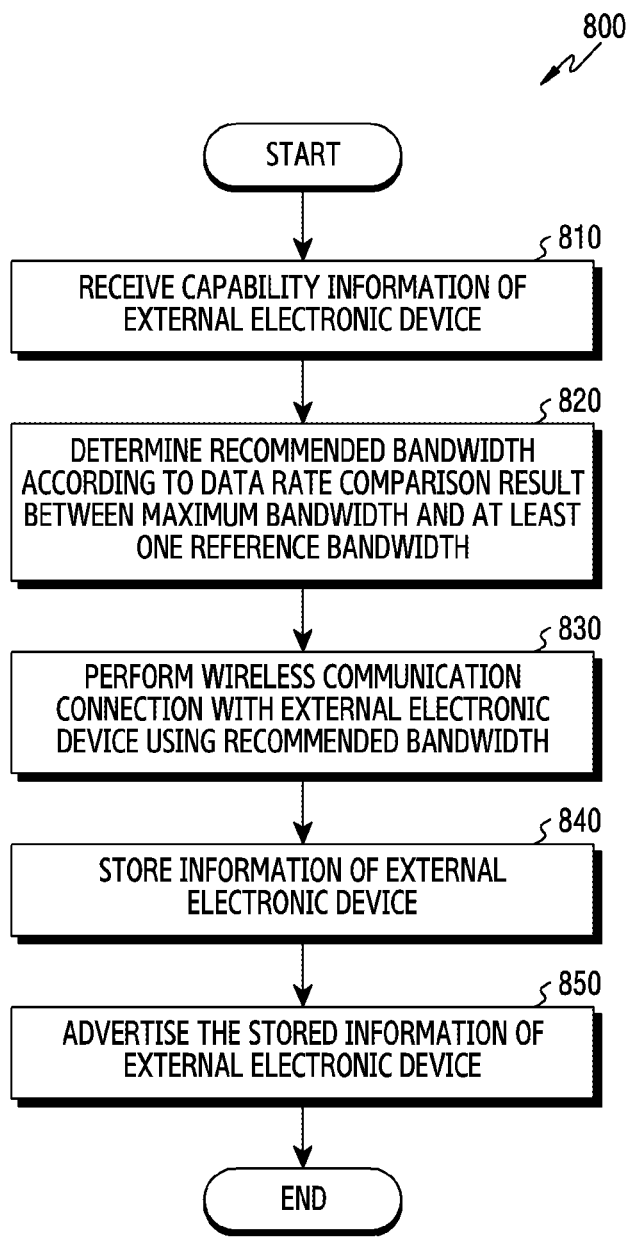
FIG. 8 is a flowchart illustrating example operation of an electronic device for advertising external electronic device information including a recommended bandwidth according to various embodiments.

FIG. 8 is a flowchart 800 illustrating example operation of an electronic device for advertising external electronic device information including a recommended bandwidth according to various embodiments. The electronic device of FIG. 8 may include the electronic device 101 of FIG. 1. An external electronic device of FIG. 8 may include the electronic device 102 of FIG. 1.

Referring to FIG. 8, in operation 810, according to an embodiment, the electronic device 101 may receive capability information of the external electronic device 102. According to an embodiment, the electronic device 101 may identify the maximum supportable bandwidth of the external electronic device 102, based on the capability information of the external electronic device 102. According to an embodiment, the electronic device 101 may identify at least one reference bandwidth within the maximum bandwidth. According to an embodiment, the electronic device 101 may determine the interference amount in the maximum bandwidth, according to the method of determining the interference amount in the bandwidth of FIG. 4. According to an embodiment, the electronic device 101 may determine the interference amount in at least one reference bandwidth, according to the method of determining the interference amount in the bandwidth of FIG. 4.

In operation 820, according to an embodiment, the electronic device 101 may determine the recommended bandwidth according to a data rate comparison result between the maximum bandwidth and at least one reference bandwidth. According to an embodiment, the electronic device 101 may determine the data rate of the maximum bandwidth, based on the interference amount in the maximum bandwidth. According to an embodiment, the electronic device 101 may determine the data rate of the at least one reference bandwidth, based on the interference amount in the at least one reference bandwidth. According to an embodiment, the electronic device 101 may determine the recommended bandwidth, based on a comparison result between the data rate of the maximum bandwidth and the data rate of at least one reference bandwidth.

In operation 830, according to an embodiment, the electronic device 101 may perform a wireless communication connection with the external electronic device 102 using the recommended bandwidth. According to an embodiment, the electronic device 101 may transmit a request for performing the wireless communication connection based on the recommended bandwidth to the external electronic device 102.

In operation 840, according to an embodiment, the electronic device 101 may store information of the external electronic device 102. According to an embodiment, the electronic device 101 may store the information of the external electronic device 102 in a storage (e.g., the memory 130 of FIG. 1) of the electronic device 101. According to an embodiment, the electronic device 101 may store the information of the external electronic device 102 in an external server (e.g., the server 108 of FIG. 1). According to an embodiment, the information of the external electronic device 102 may include at least one of recommended bandwidth information, channel information, BSSID information of the external electronic device 102, data rate indicator information, RSSI information, or frequency band information. According to an embodiment, according to the method of determining the data rate indicator of FIG. 7, the electronic device 101 may store downlink data rate indicator information as the external electronic device information. According to an embodiment, according to the method of determining the data rate indicator of FIG. 7, the electronic device 101 may store uplink data rate indicator information as the information of the external electronic device 102.

In operation 850, according to an embodiment, the electronic device 101 may advertise the stored information of the external electronic device 102. According to an embodiment, the information of the external electronic device 102 may include at least one of the recommended bandwidth information, the channel information, the BSSID information of the external electronic device 102, the data rate indicator information, RSSI information, or the frequency band information. According to an embodiment, the electronic device 101 may periodically advertise the information of the external electronic device 102. According to an embodiment, the electronic device 101 may identify whether the data rate is equal to or less than a threshold, based on the data rate indicator of the external electronic device 102. According to an embodiment, if the data rate is equal to or greater than the threshold, the electronic device 101 may advertise the information of the corresponding external electronic device 102. According to an embodiment, the electronic device 101 may determine a transmit power for the advertising. According to an embodiment, the electronic device 101 may advertise the information of the corresponding external electronic device 102, if the transmit power is less than or equal to a threshold (e.g., a transmit power receivable at the electronic device within a range of 5 m). According to an embodiment, the electronic device 101 may advertise the information of the external electronic device 102 based on a Bluetooth low energy (BLE) protocol.

Figure 9:
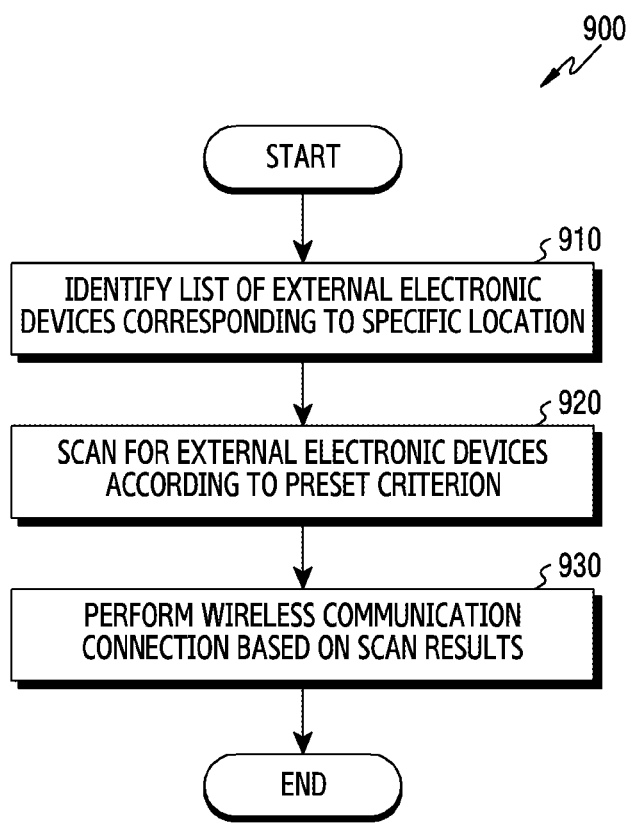
FIG. 9 is a flowchart illustrating example operation of an electronic device for performing a wireless communication connection through external electronic device information corresponding to a location according to various embodiments.

FIG. 9 is a flowchart 900 illustrating example operation of an electronic device for performing a wireless communication connection through external electronic device information corresponding to a location according to various embodiments. The electronic device of FIG. 9 may include the electronic device 101 of FIG. 1. An external electronic device of FIG. 9 may include the electronic device 102 of FIG. 1.

Referring to FIG. 9, in operation 910, according to an embodiment, the electronic device 101 may identify a list of external electronic devices 102 corresponding to a specific location. According to an embodiment, the electronic device 101 may identify a location of the electronic device 101. According to an embodiment, the electronic device 101 may identify stored information to identify the location. According to an embodiment, the stored information may include at least one of the information stored in a storage (e.g., the memory 130 of FIG. 1) of the electronic device 101 or the information stored in an external server (e.g., the server 108 of FIG. 1). According to an embodiment, as entering a specific location, the electronic device 101 may scan for the external electronic device 102 of the corresponding location. According to an embodiment, the electronic device 101 may identify the electronic device 101 at the specific location, based on the information of the scanned external electronic device 102 and prestored information of the external electronic device 102. For example, the electronic device 101 may identify the electronic device 101 at the specific location, based on a location corresponding to the BSSID of the external electronic device 102. According to an embodiment, the prestored information of the external electronic device 102 may include information of the external electronic device 102 stored in association with location information or group information of the external electronic devices 102.

According to an embodiment, if a BSSID of a scanned second external electronic device (e.g., the external electronic device 102) and the prestored BSSID of the external electronic device 102 of a first group are the same, the electronic device 101 may identify the electronic device 101 at the location corresponding to the BSSID of the first group. According to an embodiment, the electronic device 101 may identify the electronic device 101 at the specific location, based on the location information stored in association with the BSSID information of the external electronic device 102. According to an embodiment, if a BSSID of a scanned fourth external electronic device (e.g., the external electronic device 102) is the same as or similar to the prestored BSSID of the external electronic device 102 of a third group, the electronic device 101 may identify the location of the electronic device 101 according to the location information stored in association with the third group. According to an embodiment, if identifying the electronic device 101 at the specific location, the electronic device 101 may identify group information corresponding to the corresponding location. According to an embodiment, the group information corresponding to the corresponding location may include a list of external electronic devices 102 corresponding to the corresponding location.

In operation 920, according to an embodiment, the electronic device 101 may scan for the external electronic devices 102 according to a preset (e.g., specified) criterion. According to an embodiment, the electronic device 101 may scan for the external electronic devices 102 according to the preset criterion, based on the stored information of the external electronic devices 102. According to an embodiment, the preset criterion may be determined based on channel information, the data rate or the RSSI.

According to an embodiment, the electronic device 101 may first scan for the external electronic devices 102 according to the channel information, based on the stored information of the external electronic devices 102. The channel information may include channel information corresponding to supportable frequency bands of the external electronic devices 102 respectively. According to an embodiment, the electronic device 101 may first scan for the external electronic devices 102 supporting a specific frequency band.

According to an embodiment, the electronic device 101 may first scan for the external electronic devices 102 having the data rate equal to or greater than a predefined value, based on the stored information of the external electronic devices 102. According to an embodiment, the electronic device 101 may first scan for the external electronic devices 102 having the RSSI greater than or equal to a predefined value, based on the stored information of the external electronic devices 102.

In operation 930, according to an embodiment, the electronic device 101 may perform a wireless communication connection based on the scan results. According to an embodiment, the electronic device 101 may arrange the scan results of the external electronic devices 102 in descending order of the data rate. According to an embodiment, the electronic device 101 may arrange the scan results of the external electronic devices 102 in descending order of the RSSI. According to an embodiment, the electronic device 101 may arrange the scan results based on a data rate weight and an RSSI weight. According to an embodiment, the electronic device 101 may perform the wireless communication connection with the external electronic device 102 based on the arranged scan results.

Figure 10:
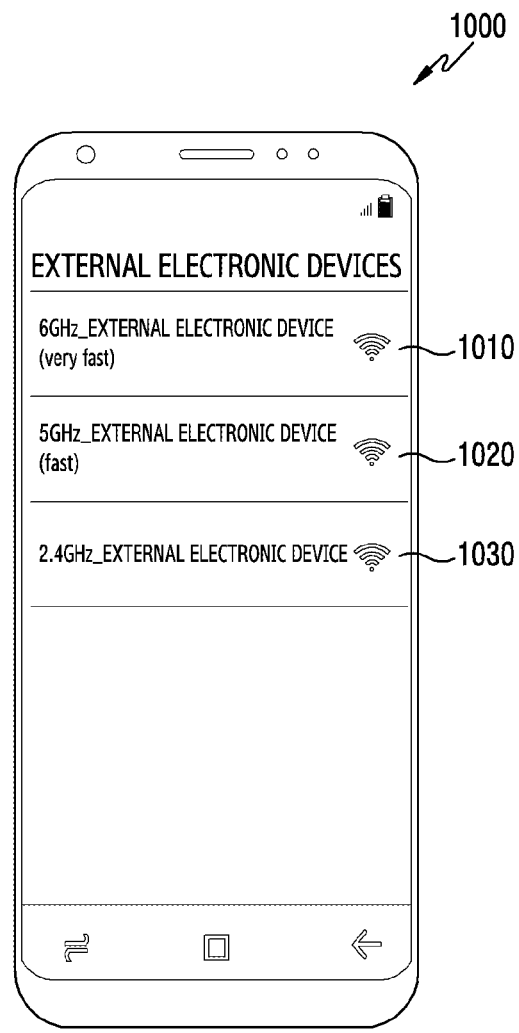
FIG. 10 is a diagram illustrating an example of displaying a scan result of external electronic devices according to a preset criterion according to various embodiments.

FIG. 10 is a diagram 1000 illustrating an example of displaying scan results of external electronic devices according to a preset criterion according to various embodiments. The electronic device of FIG. 10 may include the electronic device 101 of FIG. 1. The external electronic device of FIG. 10 may include the electronic device 102 of FIG. 1.

Referring to FIG. 10, according to an embodiment, the electronic device 101 may display the scan results of the external electronic devices 102 arranged according to the preset criterion. According to an embodiment, the scan results of the external electronic devices 102 may include at least one of 6 GHz_external electronic device (very fast) 1010, 5 GHz_external electronic device (fast) 1020, 2.4 GHz_external electronic device 1030, or a combination thereof. According to an embodiment, the electronic device 101 may display the scan results of the external electronic devices 102 according to the preset criterion based on the prestored information of the external electronic devices 102. According to an embodiment, the electronic device 101 may display the scan results of the external electronic devices 102 based on the prestored data rate indicator information of the external electronic devices 102. According to an embodiment, the electronic device 101 may display a faster data rate higher on the scan result list based on the data rate indicator information of the external electronic devices 102. According to an embodiment, the electronic device 101 may simultaneously display information (e.g., very fast, or fast) summarizing the external electronic device 102 (e.g., 6 GHz_external electronic device, 5 GHz_external electronic device) and the data rate of the external electronic device 102. According to an embodiment, the electronic device 101 may exclude the external electronic device 102 having the data rate equal to or less than the threshold from the scan results.

According to an embodiment, although not illustrated in FIG. 10, the electronic device 101 may display the scan results of the external electronic devices 102 based on the prestored RSSI information of the external electronic devices 102. According to an embodiment, the electronic device 101 may display a faster RSSI higher on the scan result list based on the RSSI information of the external electronic devices 102. According to an embodiment, the electronic device 101 may exclude the external electronic device 102 having the RSSI equal to or less than a threshold from the scan results.

Although not illustrated in FIG. 10, according to an embodiment, the electronic device 101 may display the scan results of the external electronic devices 102 based on the prestored supportable frequency band information of the external electronic devices 102. For example, the electronic device 101 may display the external electronic devices 102 for supporting a specific frequency band (e.g., a 6 GHz frequency band) high on the scan result list based on the supportable frequency band information.

Figure 11:
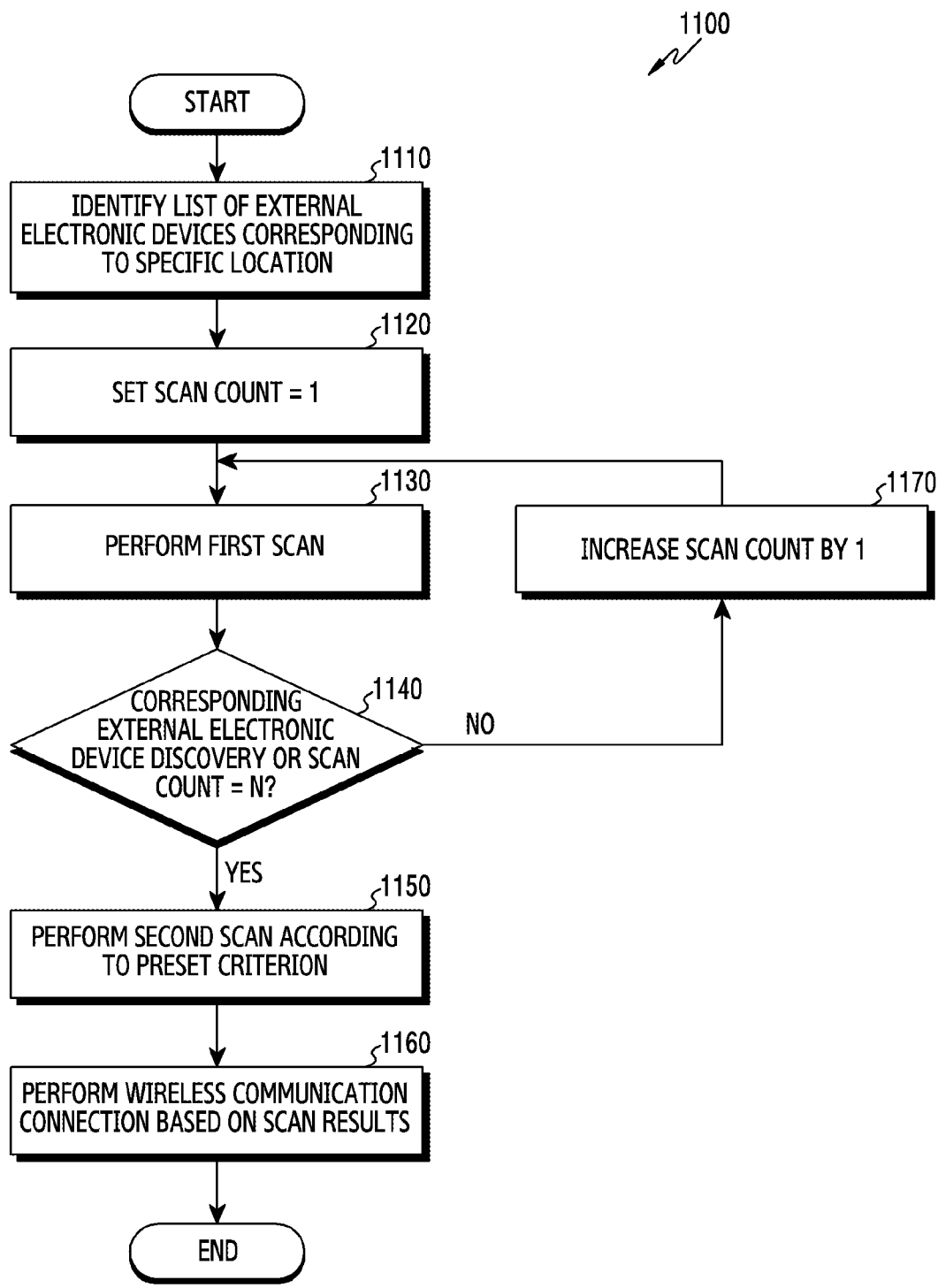
FIG. 11 is a flowchart illustrating example operation of an electronic device for first scanning for an external electronic device corresponding to a specific frequency band from external electronic device information corresponding to a location according to various embodiments.

FIG. 11 is a flowchart 1100 illustrating example operation of an electronic device for first scanning for an external electronic device corresponding to a specific frequency band from external electronic device information corresponding to a location according to various embodiments. The electronic device of FIG. 11 may include the electronic device 101 of FIG. 1. The external electronic device of FIG. 11 may include the electronic device 102 of FIG. 1. First scan of FIG. 11 may refer, for example, to scanning for the external electronic device 102 supporting a specific frequency band (e.g., a 6 GHz frequency band). Second scan of FIG. 11 may refer, for example, to scanning for the external electronic device 102 of which a preset criterion (e.g., the data rate or the RSSI) is equal to or greater than a threshold among the plurality of the external electronic devices 102. Through the first scan, the electronic device 101 may first scan for the external electronic device supporting a specific frequency band (e.g., 6 GHz frequency band) which provides better performance than other frequency band (e.g., 2.4 GHz frequency band or 5 GHz frequency band). By performing the first scan only within a preset scan count, the electronic device 101 may prevent and/or reduce waste of a scan time due to the first scan and improve the scanning efficiency of the external electronic device 102.

Referring to FIG. 11, in operation 1110, according to an embodiment, the electronic device 101 may identify a list of external electronic devices 102 corresponding to a specific location. According to an embodiment, the electronic device 101 may identify the location of the electronic device 101 based on stored information. According to an embodiment, the electronic device 101 may identify the electronic device 101 at the specific location, based on a location corresponding to the BSSID of the external electronic device 102. According to an embodiment, as entering the specific location, the electronic device 101 may identify the electronic device 101 at the specific location, based on information of the scanned external electronic device 102 and prestored information of the external electronic device 102. According to an embodiment, the electronic device 101 may identify the electronic device 101 at the specific location, based on location information stored in association with the BSSID information of the external electronic device 102. According to an embodiment, if identifying the specific location, the electronic device 101 may identify group information corresponding to the corresponding location. According to an embodiment, the group information corresponding to the corresponding location may include a list of external electronic devices 102 corresponding to the corresponding location.

In operation 1120, according to an embodiment, the electronic device 101 may set a scan count to 1. The scan count may include a first scan count for identifying the external electronic device 102 supporting a specific frequency band. According to an embodiment, the electronic device 101 may set the first scan count to 1. According to an embodiment, as the electronic device 101 counts the number of the scans (e.g., the first scan count), it may perform efficient wireless communication connection by limiting the scan time.

In operation 1130, according to an embodiment, the electronic device 101 may perform first scan. The first scan may refer, for example, to scanning for the external electronic device 102 supporting a specific frequency band (e.g., a 6 GHz frequency band). According to an embodiment, the electronic device 101 may perform the first scan for the external electronic device 102 supporting the specific frequency band. According to an embodiment, the electronic device 101 may identify supportable frequency band information from the stored information of the external electronic devices 102. According to an embodiment, the electronic device 101 may perform the first scan for identifying the external electronic device 102 supporting the specific frequency band (e.g., a 6 GHz frequency band), based on the supportable frequency band information of the external electronic devices 102.

In operation 1140, according to an embodiment, the electronic device 101 may identify whether a corresponding external electronic device discovery or scan count is N. The corresponding external electronic device may include the external electronic device 102 supporting the specific frequency band (e.g., a 6 GHz frequency band). The scan count may include the first scan count for identifying the external electronic device 102 supporting the specific frequency band. According to an embodiment, the electronic device 101 may identify whether the corresponding external electronic device discovery or first scan count is N. According to an embodiment, if discovering the corresponding external electronic device, the electronic device 101 may perform a second scan according to a preset criterion. According to an embodiment, if the first scan count is N, the electronic device 101 may perform the second scan according to a preset criterion in operation 1150. According to an embodiment, if the electronic device 101 does not discover the corresponding external electronic device and the first scan count is less than N, the first scan may be performed again.

According to an embodiment, the electronic device 101 may adaptively set the scan count N according to a situation. The scan count may include the first scan count for identifying the external electronic device 102 supporting the specific frequency band. According to an embodiment, the electronic device 101 may adaptively set the first scan count N according to a situation. According to an embodiment, the electronic device 101 may adaptively change the first scan count N according to the situation. According to an embodiment, the electronic device 101 may adaptively increase the first scan count N according to the situation. According to an embodiment, the electronic device 101 may adaptively decrease the first scan count N according to the situation.

According to an embodiment, the electronic device 101 may identify whether the corresponding external electronic device discovery or first scan count is N. According to an embodiment, the electronic device 101 may identify whether an external electronic device supporting at least one specific frequency band has been discovered. According to an embodiment, the electronic device 101 may identify whether the first scan count for discovering the external electronic device 102 supporting the specific frequency band is N.

In operation 1150, according to an embodiment, the electronic device 101 may perform a second scan according to a preset criterion. The second scan may refer, for example, to scanning for the external electronic device 102 of which the preset criterion (e.g., the data rate or the RSSI) is greater than or equal to a threshold among the plurality of the external electronic devices 102. According to an embodiment, if discovering the external electronic device supporting the specific frequency band, the electronic device 101 may perform the second scan according to the preset criterion based on first scan results. According to an embodiment, if the scan count for discovering the external electronic device 102 supporting the specific frequency band is N, the electronic device 101 may perform the second scan according to the preset criterion based on the first scan results. According to an embodiment, the preset criterion may be determined based on the data rate or the RSSI. According to an embodiment, the electronic device 101 may perform the second scan for identifying the external electronic device 102 having the stored data rate equal to or greater than a preset value, based on the stored information of the external electronic devices 102. According to an embodiment, the electronic device 101 may perform the second scan for identifying the external electronic device 102 of which the stored RSSI is equal to or greater than a preset value, based on the stored information of the external electronic devices 102.

In operation 1160, according to an embodiment, the electronic device 101 may perform a wireless communication connection based on scan results. According to an embodiment, the electronic device 101 may perform the wireless communication connection based on second scan results. According to an embodiment, the electronic device 101 may arrange the scan results of the external electronic devices 102 in descending order of the data rate. According to an embodiment, the electronic device 101 may arrange the scan results of the external electronic devices 102 in descending order of the RSSI. According to an embodiment, the electronic device 101 may arrange the scan results based on the weight of the data rate and the weight of the RSSI. According to an embodiment, the electronic device 101 may perform the wireless communication connection with the external electronic device 102 based on the arranged scan results.

As a result of the first scan in operation 1140, if the external electronic device is not discovered and the first scan count is less than N, the electronic device 101 may increase the scan count by one, in operation 1170, according to an embodiment. The scan count may include the first scan count for identifying the external electronic device 102 supporting a specific frequency band. According to an embodiment, the electronic device 101 may increase the first scan count by one. According to an embodiment, if not discovering a corresponding external electronic device supporting a specific frequency band (e.g., a 6 GHz frequency band), the electronic device 101 may increase the first scan count by one. According to an embodiment, if the scan count for discovering the corresponding external electronic device 102 supporting the specific frequency band (e.g., a 6 GHz frequency band) is less than N, the electronic device 101 may increase the first scan count by 1. According to an embodiment, if the corresponding external electronic device is not discovered and the first scan count is less than N, the electronic device 101 may increase the first scan by one. According to an embodiment, if the corresponding external electronic device is not discovered and the first scan count is less than N, the electronic device 101 may perform the first scan again.

Figure 12:
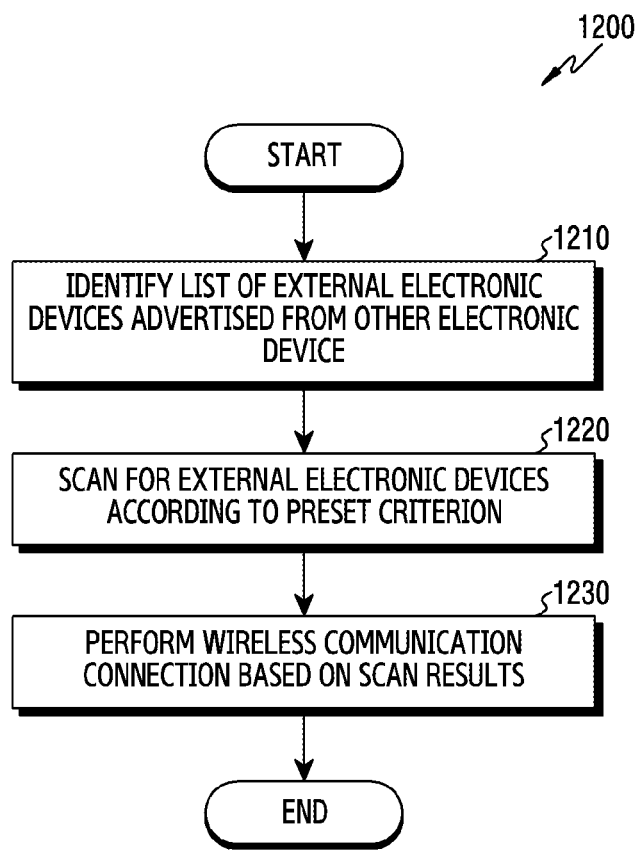
FIG. 12 is a flowchart illustrating example operation of an electronic device for performing a wireless communication connection through advertised external electronic device information according to various embodiments.

FIG. 12 is a flowchart 1200 illustrating example operation of an electronic device for performing a wireless communication connection through advertised external electronic device information according to various embodiments. The electronic device of FIG. 12 may include the electronic device 101 of FIG. 1. The external electronic device of FIG. 12 may include the electronic device 102 of FIG. 1.

Referring to FIG. 12, in operation 1210, according to an embodiment, the electronic device 101 may identify a list of external electronic devices 102 advertised from another electronic device. According to an embodiment, the electronic device 101 may acquire information of the external electronic devices 102, based on the list of the external electronic devices 102. According to an embodiment, the information of the external electronic devices 102 may include at least one of recommended bandwidth information, channel information, BSSID information of the external electronic devices 102, data rate indicator information, RSSI information, or frequency band information.

In operation 1220, according to an embodiment, the electronic device 101 may scan for the external electronic devices 102 according to a preset criterion. According to an embodiment, the electronic device 101 may scan for the external electronic devices 102 according to a preset criterion, based on stored information of the external electronic devices 102. According to an embodiment, the preset criterion may be determined based on the channel information, the data rate, or the RSSI.

According to an embodiment, the electronic device 101 may first scan for the external electronic devices 102 according to the channel information, based on the stored information of the external electronic devices 102. The channel information may include channel information corresponding to the supportable frequency bands of the external electronic devices 102 respectively. According to an embodiment, the electronic device 101 may first scan for the external electronic devices 102 supporting a specific frequency band (e.g., a 6 GHz frequency band).

According to an embodiment, the electronic device 101 may first scan for the external electronic devices 102 having the data rate equal to or greater than a preset value, based on the stored information of the external electronic devices 102. According to an embodiment, the electronic device 101 may first scan for the external electronic devices 102 of which the RSSI is greater than or equal to a preset value, based on the stored information of the external electronic devices 102.

In operation 1230, according to an embodiment, the electronic device 101 may perform a wireless communication connection based on scan results. According to an embodiment, the electronic device 101 may arrange the scan results of the external electronic devices 102 in descending order of the data rate. According to an embodiment, the electronic device 101 may arrange the scan results of the external electronic devices 102 in descending order of the RSSI. According to an embodiment, the electronic device 101 may arrange the scan results based on the weight of the data rate and the weight of the RSSI. According to an embodiment, the electronic device 101 may perform the wireless communication connection with the external electronic device 102 based on the arranged scan results.

Figure 13:
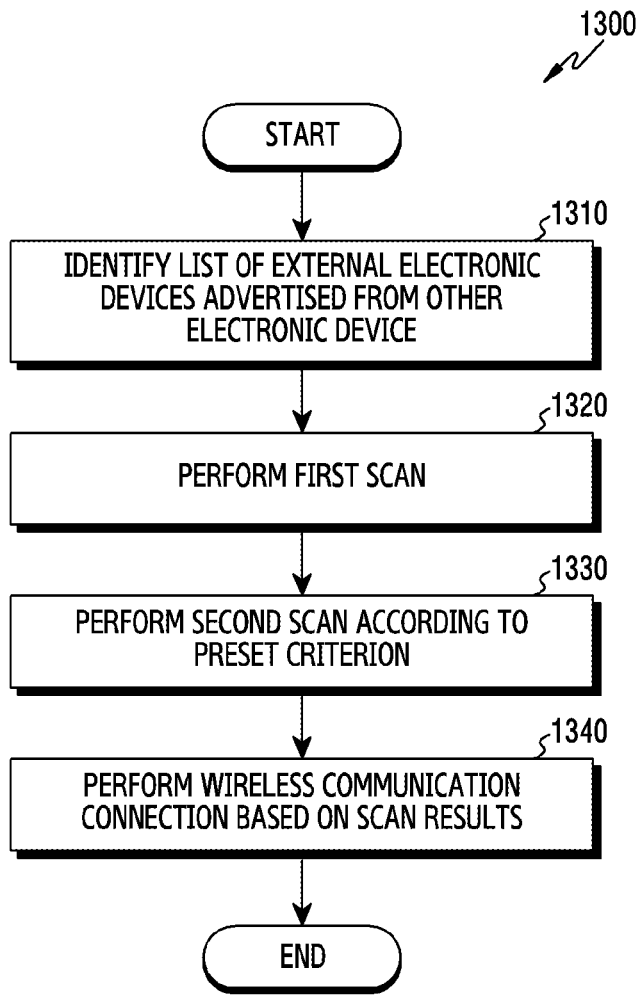
FIG. 13 is a flowchart illustrating example operation of an electronic device for first scanning for an external electronic device corresponding to a specific frequency band from advertised external electronic device information according to various embodiments.

FIG. 13 is a flowchart 1300 illustrating example operation of an electronic device for first scanning for an external electronic device corresponding to a specific frequency band from advertised external electronic device information according to various embodiments. The electronic device of FIG. 13 may include the electronic device 101 of FIG. 1. The external electronic device of FIG. 13 may include the electronic device 102 of FIG. 1.

Referring to FIG. 13, in operation 1310, according to an embodiment, the electronic device 101 may identify a list of external electronic devices 102 advertised from another electronic device. According to an embodiment, the electronic device 101 may acquire information of the external electronic devices 102, based on the list of the external electronic devices 102. According to an embodiment, the information of the external electronic devices 102 may include at least one of recommended bandwidth information, channel information, BSSID information of the external electronic devices 102, data rate indicator information, RSSI information, or frequency band information.

In operation 1320, according to an embodiment, the electronic device 101 may perform a first scan. According to an embodiment, the electronic device 101 may perform a first scan for the external electronic device 102 supporting a specific frequency band. According to an embodiment, the electronic device 101 may identify supportable frequency band information from the stored information of the external electronic devices 102. According to an embodiment, the electronic device 101 may perform the first scan for the external electronic device 102 supporting the specific frequency band (e.g., a 6 GHz frequency band), based on the supportable frequency band information of the external electronic devices 102. According to an embodiment, the electronic device 101 may identify a first scan count.

In operation 1330, according to an embodiment, the electronic device 101 may perform a second scan according to a preset criterion. According to an embodiment, if discovering the external electronic device 102 supporting the specific frequency band, the electronic device 101 may perform the second scan according to a preset criterion based on first scan results. According to an embodiment, if the first scan count for discovering the external electronic device 102 supporting the specific frequency band is N, the electronic device 101 may perform the second scan according to the preset criterion based on the first scan results. According to an embodiment, the electronic device 101 may adaptively change the first scan count N according to a situation.

According to an embodiment, the preset criterion may be determined based on the data rate or the RSSI. According to an embodiment, the electronic device 101 may perform the second scan on the external electronic devices 102 having the data rate equal to or greater than a preset value, based on the stored information of the external electronic devices 102. According to an embodiment, the electronic device 101 may perform the second scan on the external electronic devices 102 having the RSSI equal to or greater than a preset value, based on the stored information of the external electronic devices 102.

In operation 1340, according to an embodiment, the electronic device 101 may perform a wireless communication connection based on scan results. According to an embodiment, the electronic device 101 may perform a wireless communication connection based on second scan results. According to an embodiment, the electronic device 101 may sort the scan results of the external electronic devices 102 in descending order of the data rate. According to an embodiment, the electronic device 101 may arrange the scan results of the external electronic devices 102 in descending order of the RSSI. According to an embodiment, the electronic device 101 may arrange the scan results based on the weight of the data rate and the weight of the RSSI. According to an embodiment, the electronic device 101 may perform the wireless communication connection with the external electronic device 102 based on the arranged scan results.

An electronic device according to an example embodiment, may include: a communication circuit (e.g., the communication module 190) and a processor operatively connected to the communication circuit (e.g., the communication module 190), wherein the processor may be configured to: receive capability information including a maximum bandwidth of an external electronic device, determine a recommended bandwidth based on a comparison result of a first data rate according to interference in the maximum bandwidth of the external electronic device and a second data rate according to interference in at least one reference bandwidth, and control the communication circuit to perform a wireless communication connection with the external electronic device using the recommended bandwidth.

According to an example embodiment, the at least one reference bandwidth may include a first reference bandwidth including a primary channel of the external electronic device and a second reference bandwidth not including the primary channel, wherein the primary channel may be determined based on the capability information.

According to an example embodiment, to determine the recommended bandwidth, the processor may be configured to: determine an interference amount in the maximum bandwidth, determine an interference amount in the at least one reference bandwidth, determine the first data rate of the maximum bandwidth based on the interference amount in the maximum bandwidth, and determine the second data rate of the at least one reference bandwidth based on the interference amount in the at least one reference bandwidth.

According to an example embodiment, the interference amount in the maximum bandwidth may be determined based on a ratio of a time for which an energy level of the maximum bandwidth exceeds a threshold for a designated time, and the interference amount in the at least one reference bandwidth may be determined based on a ratio of a time for which the energy level of the at least one reference bandwidth exceeds the threshold value for the designated time.

According to an example embodiment, the processor may be further configured further to: based on the wireless communication connection being established with the external electronic device using the recommended bandwidth, determine a data rate of the recommended bandwidth, and store information of the external electronic device, wherein the information of the external electronic device may include at least one of the recommended bandwidth, a data rate indicator of the recommended bandwidth, a basic service set identifier (BSSID), a received signal strength indicator (RSSI), and a frequency band of the external electronic device.

According to an example embodiment, the processor may be configured to advertise the stored information of the external electronic device to at least one other electronic device.

According to an example embodiment, the processor may, based on disconnecting from the external electronic device, be configured to re-establish the wireless communication connection with the external electronic device based on the stored information of the external electronic device.

According to an example embodiment, the processor may be configured to perform a first scan for external electronic devices (e.g., the eternal electronic device 102) supporting a specific frequency band, based on the stored information of the external electronic device.

According to an example embodiment, the processor may be configured to perform the wireless communication connection with the external electronic device, based on information advertised from another electronic device.

According to an example embodiment, the processor may be configured to perform a first scan for external electronic devices (e.g., the external electronic device 102) supporting a specific frequency band, based on information advertised from the other electronic device.

A method of operating an electronic device according to an example embodiment may include: receiving capability information including a maximum bandwidth of an external electronic device, determining a recommended bandwidth based on a comparison result of a first data rate according to interference in the maximum bandwidth of the external electronic device and a second data rate according to interference in at least one reference bandwidth, and performing a wireless communication connection with the external electronic device using the recommended bandwidth.

According to an example embodiment, the at least one reference bandwidth may include a first reference bandwidth including a primary channel of the external electronic device and a second reference bandwidth not including the primary channel, wherein the primary channel may be determined based on the capability information.

According to an example embodiment, the determining the recommended bandwidth may include: determining an interference amount in the maximum bandwidth, determining an interference amount in the at least one reference bandwidth, determining the first data rate of the maximum bandwidth based on the interference amount in the maximum bandwidth, and determining the second data rate of the at least one reference bandwidth based on the interference amount in the at least one reference bandwidth.

According to an example embodiment, the interference amount in the maximum bandwidth may be determined based on a ratio of a time for which an energy level of the maximum bandwidth exceeds a threshold for a designated time, and the interference amount in the at least one reference bandwidth may be determined based on a ratio of a time for which the energy level of the at least one reference bandwidth exceeds the threshold value for the designated time.

According to an example embodiment, the method may further include: based on the wireless communication connection being established with the external electronic device using the recommended bandwidth, determining a data rate of the recommended bandwidth, and storing information of the external electronic device, wherein the information of the external electronic device may include at least one of the recommended bandwidth, a data rate indicator of the recommended bandwidth, a basic service set identifier (BSSID), a received signal strength identifier (RSSI), and a frequency band of the external electronic device.

According to an example embodiment, the method may further include advertising the stored information of the external electronic device to at least one other electronic device.

According to an example embodiment, the method may further include, based on disconnecting from the external electronic device, re-establishing the wireless communication connection with the external electronic device based on the stored information of the external electronic device.

According to an example embodiment, the method may further include first scanning for external electronic devices (e.g., the external electronic device 102) supporting a specific frequency band, based on the stored information of the external electronic device.

According to an example embodiment, the method may further include performing the wireless communication connection with the external electronic device, based on information advertised from another electronic device.

According to an example embodiment, the method may further include first scanning for external electronic devices (e.g., the external electronic device 102) supporting a specific frequency band, based on information advertised from the other electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a communication circuit; and
a processor electrically connected to the communication circuit, wherein the processor is configured to:
receive capability information comprising a maximum bandwidth of an external electronic device,
determine a recommended bandwidth based on a comparison result of a first data rate according to interference in the maximum bandwidth of the external electronic device and a second data rate according to interference in at least one reference bandwidth, and
control the communication circuit to perform a wireless communication connection with the external electronic device using the recommended bandwidth.

2. The electronic device of claim 1, wherein the at least one reference bandwidth comprises a first reference bandwidth comprising a primary channel of the external electronic device and a second reference bandwidth not comprising the primary channel, and
wherein the primary channel is determined based on the capability information.

3. The electronic device of claim 1, wherein, to determine the recommended bandwidth, the processor is configured to:
determine an interference amount in the maximum bandwidth,
determine an interference amount in the at least one reference bandwidth,
determine the first data rate of the maximum bandwidth based on the interference amount in the maximum bandwidth, and
determine the second data rate of the at least one reference bandwidth based on the interference amount in the at least one reference bandwidth.

4. The electronic device of claim 3, wherein the interference amount in the maximum bandwidth is determined based on a ratio of a time for which an energy level of the maximum bandwidth exceeds a threshold for a designated time, and
wherein the interference amount in the at least one reference bandwidth is determined based on a ratio of a time for which the energy level of the at least one reference bandwidth exceeds the threshold value for the designated time.

5. The electronic device of claim 1, wherein the processor is further configured to:
based on the wireless communication connection being established with the external electronic device using the recommended bandwidth, determine a data rate of the recommended bandwidth, and
store information of the external electronic device,
wherein the information of the external electronic device comprises at least one of the recommended bandwidth, a data rate indicator of the recommended bandwidth, a basic service set identifier (BSSID), a received signal strength indicator (RSSI), and a frequency band of the external electronic device.

6. The electronic device of claim 5, wherein the processor is further configured to:
advertise the stored information of the external electronic device to at least one other electronic device.

7. The electronic device of claim 5, wherein the processor is further configured to:
based on disconnecting from the external electronic device, re-establish the wireless communication connection with the external electronic device based on the stored information of the external electronic device.

8. The electronic device of claim 7, wherein the processor is further configured to:
first scan for external electronic devices supporting a specific frequency band, based on the stored information of the external electronic device.

9. The electronic device of claim 1, wherein the processor is further configured to:
perform the wireless communication connection with the external electronic device, based on information advertised from at least one other electronic device.

10. The electronic device of claim 9, wherein the processor is further configured to:
first scan for external electronic devices supporting a specific frequency band based on information advertised from the at least one other electronic device.

11. A method of operating an electronic device, comprising:
receiving capability information comprising a maximum bandwidth of an external electronic device;
determining a recommended bandwidth based on a comparison result of a first data rate according to interference in the maximum bandwidth of the external electronic device and a second data rate according to interference in at least one reference bandwidth; and
performing a wireless communication connection with the external electronic device using the recommended bandwidth.

12. The method of claim 11, wherein the at least one reference bandwidth comprises a first reference bandwidth comprising a primary channel of the external electronic device and a second reference bandwidth not comprising the primary channel, and
wherein the primary channel is determined based on the capability information.

13. The method of claim 11, wherein the determining the recommended bandwidth comprises:
determining an interference amount in the maximum bandwidth;
determining an interference amount in the at least one reference bandwidth;

determining the first data rate of the maximum bandwidth based on the interference amount in the maximum bandwidth; and determining the second data rate of the at least one reference bandwidth based on the interference amount in the at least one reference bandwidth.

14. The method of claim 13, wherein the interference amount in the maximum bandwidth is determined based on a ratio of a time for which an energy level of the maximum bandwidth exceeds a threshold for a designated time, and wherein the interference amount in the at least one reference bandwidth is determined based on a ratio of a time for which the energy level of the at least one reference bandwidth exceeds the threshold value for the designated time.

15. The method of claim 11, further comprising:

based on the wireless communication connection being established with the external electronic device using the recommended bandwidth, determining a data rate of the recommended bandwidth; and storing information of the external electronic device, wherein the information of the external electronic device comprises at least one of the recommended bandwidth, a data rate indicator of the recommended bandwidth, a basic service set identifier (BSSID), a received signal strength indicator (RSSI), and a frequency band of the external electronic device.

16. The method of claim 15, further comprising:

advertising the stored information of the external electronic device to at least one other electronic device.

17. The method of claim 15, further comprising:

based on disconnecting from the external electronic device, re-establishing the wireless communication connection with the external electronic device based on the stored information of the external electronic device.

18. The method of claim 17, further comprising:

first scanning for external electronic devices supporting a specific frequency band, based on the stored information of the external electronic device.

19. The method of claim 11, further comprising:

performing the wireless communication connection with the external electronic device, based on information advertised from at least one other electronic device.

20. The method of claim 19, further comprising:

first scanning for external electronic devices supporting a specific frequency band based on information advertised from the at least one other electronic device.

* * * * *